(12) United States Patent
Wang

(10) Patent No.: US 12,126,823 B2
(45) Date of Patent: Oct. 22, 2024

(54) SUPPORT OF MIXED IRAP AND NON-IRAP PICTURES WITHIN AN ACCESS UNIT IN MULTI-LAYER VIDEO BITSTREAMS

(71) Applicant: Huawei Technologies Co., Ltd., Shenzhen (CN)

(72) Inventor: Ye-Kui Wang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 134 days.

(21) Appl. No.: 17/700,845

(22) Filed: Mar. 22, 2022

(65) Prior Publication Data

US 2022/0217369 A1 Jul. 7, 2022

Related U.S. Application Data

(63) Continuation of application No. PCT/US2020/050988, filed on Sep. 16, 2020.
(Continued)

(51) Int. Cl.
| | |
|---|---|
| *H04N 19/46* | (2014.01) |
| *H04N 19/107* | (2014.01) |
| *H04N 19/11* | (2014.01) |
| *H04N 19/136* | (2014.01) |
| *H04N 19/14* | (2014.01) |

(Continued)

(52) U.S. Cl.
CPC .......... *H04N 19/46* (2014.11); *H04N 19/107* (2014.11); *H04N 19/11* (2014.11); *H04N 19/136* (2014.11); *H04N 19/14* (2014.11); *H04N 19/172* (2014.11); *H04N 19/184* (2014.11); *H04N 19/187* (2014.11); *H04N 19/43* (2014.11); *H04N 19/593* (2014.11)

(58) Field of Classification Search
CPC ...... H04N 19/46; H04N 19/107; H04N 19/11; H04N 19/136; H04N 19/14; H04N 19/172; H04N 19/184; H04N 19/187; H04N 19/43; H04N 19/593
USPC ..................................................... 375/240.02
See application file for complete search history.

(56) References Cited

U.S. PATENT DOCUMENTS

| | | | |
|---|---|---|---|
| 9,654,774 | B2 | 5/2017 | Hendry et al. |
| 9,854,270 | B2 | 12/2017 | Ramasubramonian et al. |

(Continued)

FOREIGN PATENT DOCUMENTS

| | | |
|---|---|---|
| CN | 106233727 A | 12/2016 |
| JP | 2015527756 A | 9/2015 |

(Continued)

OTHER PUBLICATIONS

Document: JCTVC-K0227, Zhou, X., et al., "On POC Signalling," Joint Collaborative Team on Video Coding (JCT-VC) of ITU-T SG 16 WP 3 and ISO/IEC JTC 1/SC 29/WG 11, 11th Meeting: Shanghai, CN, Oct. 10-19, 2012, 8 pages.

(Continued)

*Primary Examiner* — Nguyen T Truong
(74) *Attorney, Agent, or Firm* — Conley Rose, P.C.

(57) ABSTRACT

A method of decoding implemented by a video decoder is provided. The method includes receiving a bitstream including a coded video sequence start (CVSS) access unit (AU), wherein the CVSS AU contains a picture unit (PU) for each layer, and wherein a coded picture in each PU is a coded layer video sequence start (CLVSS) picture; identifying the coded picture from one of the layers based on a picture order count (POC) value; and decoding the coded picture to obtain a decoded picture.

16 Claims, 13 Drawing Sheets

Related U.S. Application Data

(60) Provisional application No. 62/905,141, filed on Sep. 24, 2019.

(51) Int. Cl.
   H04N 19/172    (2014.01)
   H04N 19/184    (2014.01)
   H04N 19/187    (2014.01)
   H04N 19/43     (2014.01)
   H04N 19/593    (2014.01)

(56) References Cited

U.S. PATENT DOCUMENTS

| | | |
|---|---|---|
| 10,230,972 B2 | 3/2019 | Deshpande |
| 10,362,304 B2 | 7/2019 | Li et al. |
| 2012/0207227 A1 | 8/2012 | Tsai et al. |
| 2013/0142256 A1 | 6/2013 | Wang et al. |
| 2013/0142257 A1 | 6/2013 | Wang et al. |
| 2014/0086315 A1 | 3/2014 | Zhang et al. |
| 2014/0092963 A1 | 4/2014 | Wang |
| 2014/0198857 A1 | 7/2014 | Deshpande |
| 2014/0334557 A1 | 11/2014 | Schierl et al. |
| 2015/0110192 A1 | 4/2015 | Wang et al. |
| 2015/0181233 A1 | 6/2015 | Ramasubramonian et al. |
| 2015/0195577 A1 | 7/2015 | Hannuksela |
| 2015/0264370 A1 | 9/2015 | Ramasubramonian et al. |
| 2015/0264404 A1 | 9/2015 | Hannuksela |
| 2015/0271525 A1 | 9/2015 | Hendry et al. |
| 2015/0382018 A1 | 12/2015 | Hendry et al. |
| 2019/0166372 A1 | 5/2019 | Hendry et al. |

FOREIGN PATENT DOCUMENTS

| | | |
|---|---|---|
| JP | 2017525240 A | 8/2017 |
| RU | 2594760 C2 | 8/2016 |
| RU | 2653299 C2 | 5/2018 |
| RU | 2676876 C2 | 1/2019 |
| WO | 2014006854 A1 | 1/2014 |
| WO | 2014163460 A1 | 10/2014 |
| WO | 2015052939 A1 | 4/2015 |
| WO | 2015089415 A1 | 6/2015 |
| WO | 2020009044 A1 | 1/2020 |
| WO | 2020141258 A1 | 7/2020 |
| WO | 2021136533 A1 | 7/2021 |

OTHER PUBLICATIONS

Document: JVET-O0471, Thomas, E., et al., "AHG8/AHG12: Layer concepts clarifications and improvements for immersive media use cases," Joint Video Experts Team (JVET) of ITU-T SG16 WP3 and ISO/IEC JTC1/SC29/WG11, 15th Meeting: Gothenburg, SE, Jul. 3-12, 2019, 5 pages.

Document: JVET-L0449-v2, Deshpande, S., et al., "On Picture Order Count Signaling for VVC," Joint Video Experts Team (JVET) of ITU-T SG16 WP3 and ISO/IEC JTC1/SC29/WG11, 11th Meeting: Ljubljana, SI, Jul. 10-18, 2018, 6 pages.

Document: JVET-O2001-vE, Bross, B., et al., "Versatile Video Coding (Draft 6)" Joint Video Experts Team (JVET) of ITU-T SG16 WP3 and ISO/IEC JTC1/SC29/WG11, 15th Meeting: Gothenburg, SE, Jul. 3-12, 2019, 9 pages.

Document: JVET-S2001-vH, Bross, B., et al., "Versatile Video Coding (Draft 10)," Joint Video Experts Team (JVET) of ITU-T SG16 WP3 and ISO/IEC JTC1/SC29/WG11, 19th Meeting: by teleconference, Jun. 22-Jul. 1, 2020, 4 pages.

Document: JVET-N0108-v1, Wang, Y., et al., "AHG12: Allowing mixed IRAP and non-IRAP NAL unit types within a picture," Joint Video Experts Team (JVET) of ITU-T SG 16 WP 3 and ISO/IEC JTC 1/SC 29/WG 11, 14th Meeting: Geneva, CH, Mar. 19-27, 2019, 3 pages.

Document: JVET-M1000-v1, Sullivan, G., et al., "Meeting Report of the 13th Meeting of the Joint Video Experts Team (JVET), Marrakech, MA, Jan. 9-18, 2019," Joint Video Experts Team (JVET) of ITU-T SG 16 WP 3 and ISO/IEC JTC 1/SC 29/WG 11, 13th Meeting: Marrakech, MA, Jan. 9-18, 2019, 357 pages.

Document: JCT3V-F1004-v6, Tech, G., et al., "MV-HEVC Draft Text 6," Joint Collaborative Team on 3D Video Coding Extension Development of ITU-T SG 16 WP 3 and ISO/IEC JTC 1/SC 29/WG 11, 6th Meeting: Geneva, CH, Oct. 25-Nov. 1, 2013, 118 pages.

Document: JVET-R0065-v1, Wang, Y., et al., "AHG8/AHG9: On IRAP and GDR AUs," Joint Video Experts Team (JVET) of ITU-T SG 16 WP 3 and ISO/IEC JTC 1/SC 29/WG11, 18th Meeting: by teleconference, Apr. 15-24, 2020, 3 pages.

Document: JVET-O0471, Thomas, E., et al., "AHG8/AHG12: Layer concepts clarifications and improvements for immersive media use cases," Joint Video Experts Team (JVET) of ITU-T SG 16 WP 3 and ISO/IEC JTC 1/SC 29/WG 11, 15th Meeting: Gothenburg, SE, Jul. 3-12, 2019, 6 pages.

Document: JVET-S0239, Park, N., et al., "AHG9: Clean-up on derivation of POC," Joint Video Experts Team (JVET) of ITU-T SG 16 WP 3 and ISO/IEC JTC 1/SC 29/WG11, 19th Meeting: by teleconference, Jun. 22-Jul. 1, 2020, 3 pages.

Document: JVET-O2001-v7, Bross, B., et al., "Versatile Video Coding (Draft 6)," Joint Video Experts Team (JVET) of ITU-T SG 16 WP 3 and ISO/IEC JTC 1/ SC 29/WG11, 15th Meeting: Gothenburg, SE, Jul. 3-12, 2019, 425 pages.

"Line Transmission of Non-Telephone Signals Video Codec for Audiovisual Services AT p × 64 kbits," ITU-T Recommendation H.261, Mar. 1993, 29 pages.

"Transmission of Non-Telephone Signals; Information Technology—Generic Coding of Moving Pictures and Associated Audio Information: Video," ITU-T Recommendation H.262, Jul. 1995, 211 pages.

"Series H: Audiovisual and Multimedia Systems; Infrastructure of audiovisual services—Coding of moving video; Video coding for low bit rate communication," ITU-T Recommendation H.263, Jan. 2005, 226 pages.

"Series H: Audiovisual and Multimedia Systems; Infrastructure of audiovisual services—Coding of moving video; Advanced video coding for generic audiovisual services," Recommendation ITU-T H.264, Jun. 2019, 836 pages.

"Series H: Audiovisual and Multimedia Systems; Infrastructure of audiovisual services—Coding of moving video; High efficiency video coding" Recommendation ITU-T H.265, Apr. 2013, 317 pages.

JVET-O2001-vE, Bross, B., et al., "Versatile Video Coding (Draft 6)," Joint Video Experts Team (JVET) of ITU-T SG 16 WP 3 and ISO/IEC JTC 1/SC 29/WG 11, 15th Meeting: Gothenburg, SE, Jul. 3-12, 2019, 455 pages.

SUPPORT OF MIXED IRAP AND NON-IRAP PICTURES WITHIN AN ACCESS UNIT IN MULTI-LAYER VIDEO BITSTREAMS

CROSS-REFERENCE TO RELATED APPLICATIONS

This patent application is a continuation of International Application No. PCT/US2020/050988 filed on Sep. 16, 2020, by Futurewei Technologies, Inc., and titled "Support Of Mixed TRAP And Non-TRAP Pictures Within An Access Unit In Multi-Layer Video Bitstreams," which claims the benefit of U.S. Provisional Patent Application No. 62/905,141 filed Sep. 24, 2019, by Futurewei Technologies, Inc., and titled "Support of Mixed RAP and Non-RAP Pictures Within An Access Unit In Multiple-Layer Video Bitstreams," each of which is hereby incorporated by reference.

TECHNICAL FIELD

In general, this disclosure is related to multiple-layer video bitstreams in video coding. More specifically, this disclosure is related to supporting multiple-layer video bitstreams containing both intra random access point (TRAP) and non-TRAP pictures.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

A first aspect relates to a method of decoding implemented by a video decoder, comprising receiving, by the video decoder, a bitstream including a coded video sequence start (CVSS) access unit (AU), wherein the CVSS AU contains a picture unit (PU) for each layer, and wherein a coded picture in each PU is a coded layer video sequence start (CLVSS) picture; identifying, by the video decoder, the coded picture from one of the layers based on a picture order count (POC) value; and decoding, by the video decoder, the coded picture to obtain a decoded picture.

The method provides techniques that simplify coding by utilizing a bitstream that is constrained so that each coded video sequence start (CVSS) access unit (AU) is a complete AU and each picture in the CVSS AU is a coded layer video sequence start (CLVSS) picture. This ensures that a random access point (RAP) is provided for each layer of the multi-layer bitstream at the start of every coded video sequence (CVS). Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the CLVSS picture is an intra random access point (IRAP) picture.

Optionally, in any of the preceding aspects, another implementation of the aspect provides that the CLVSS picture is gradual decoding refresh (GDR) picture.

Optionally, in any of the preceding aspects, another implementation of the aspect provides that the CLVSS picture is associated with a no output before recovery flag disposed in a picture parameter set (PPS) of the PU, and wherein the no output before recovery flag is equal to 1.

Optionally, in any of the preceding aspects, another implementation of the aspect provides that each layer of the CVSS AU is specified by a video parameter set (VPS).

Optionally, in any of the preceding aspects, another implementation of the aspect provides that the CVSS AU is an initial AU of a coded video sequence (CVS).

Optionally, in any of the preceding aspects, another implementation of the aspect provides that the PU is referred to as a layer access unit.

Optionally, in any of the preceding aspects, another implementation of the aspect provides that the CVSS AU is referred to as a complete AU because each layer of the CVSS AU contains one of the PUs.

Optionally, in any of the preceding aspects, another implementation of the aspect provides that displaying the coded picture as decoded on a display of an electronic device.

A second aspect relates to a method of encoding implemented by a video encoder, the method comprising inserting, by the video encoder, a picture unit (PU) containing a coded picture in each layer of a coded video sequence start (CVSS) access unit (AU), wherein the video encoder is constrained such that the coded picture is a coded layer video sequence start (CLVSS) picture; encoding, by the video encoder, a coded layer video sequence (CLVS) including the CVSS AU into a bitstream; and storing, by the video encoder, the bitstream for communication toward a video decoder.

The method provides techniques that simplify coding by utilizing a bitstream that is constrained so that each coded video sequence start (CVSS) access unit (AU) is a complete AU and each picture in the CVSS AU is a coded layer video sequence start (CLVSS) picture. This ensures that a random access point (RAP) is provided for each layer of the multi-layer bitstream at the start of every coded video sequence (CVS). Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the CLVSS picture is an intra random access point (TRAP) picture.

Optionally, in any of the preceding aspects, another implementation of the aspect provides that the CLVSS picture is gradual decoding refresh (GDR) picture.

Optionally, in any of the preceding aspects, another implementation of the aspect provides that each layer of the CVSS AU is specified by a video parameter set (VPS).

A third aspect relates to a decoding device, comprising a receiver configured to receive a bitstream including a coded video sequence start (CVSS) access unit (AU), wherein the CVSS AU contains a picture unit (PU) for each layer, and wherein a coded picture in each PU is a coded layer video sequence start (CLVSS) picture; a memory coupled to the receiver, the memory storing instructions; and a processor coupled to the memory, the processor configured to execute the instructions to cause the decoding device to identify the coded picture from one of the layers based on a picture order count (POC) value; and decode the coded picture to obtain a decoded picture.

The decoding device provides techniques that simplify coding by utilizing a bitstream that is constrained so that each coded video sequence start (CVSS) access unit (AU) is a complete AU and each picture in the CVSS AU is a coded layer video sequence start (CLVSS) picture. This ensures that a random access point (RAP) is provided for each layer of the multi-layer bitstream at the start of every coded video sequence (CVS). Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the CLVSS picture is an intra random access point (IRAP) picture.

Optionally, in any of the preceding aspects, another implementation of the aspect provides that the CLVSS picture is gradual decoding refresh (GDR) picture.

Optionally, in any of the preceding aspects, another implementation of the aspect provides that each layer of the CVSS AU is specified by a video parameter set (VPS).

A fourth aspect relates to an encoding device, comprising a memory containing instructions; a processor coupled to the memory, the processor configured to implement the instructions to cause the encoding device to insert a picture unit (PU) containing a coded picture in each layer of a coded video sequence start (CVSS) access unit (AU), wherein the encoding device is constrained such that the coded picture is a coded layer video sequence start (CLVSS) picture; encode a coded layer video sequence (CLVS) including the CVSS AU into a bitstream; and a transmitter coupled to the processor, the transmitter configured to transmit the video bitstream toward a video decoder.

The encoding device provides techniques that simplify coding by utilizing a bitstream that is constrained so that each coded video sequence start (CVSS) access unit (AU) is a complete AU and each picture in the CVSS AU is a coded layer video sequence start (CLVSS) picture. This ensures that a random access point (RAP) is provided for each layer of the multi-layer bitstream at the start of every coded video sequence (CVS). Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that the CLVSS picture is an intra random access point (IRAP) picture or a gradual decoding refresh (GDR) picture.

Optionally, in any of the preceding aspects, another implementation of the aspect provides that each layer of the CVSS AU is specified by a video parameter set (VPS).

A fifth aspect relates to a coding apparatus. The coding apparatus includes a receiver configured to receive a picture to encode or to receive a bitstream to decode; a transmitter coupled to the receiver, the transmitter configured to transmit the bitstream to a decoder or to transmit a decoded image to a display; a memory coupled to at least one of the receiver or the transmitter, the memory configured to store instructions; and a processor coupled to the memory, the processor configured to execute the instructions stored in the memory to perform any of the methods disclosed herein.

The coding apparatus provides techniques that simplify coding by utilizing a bitstream that is constrained so that each coded video sequence start (CVSS) access unit (AU) is a complete AU and each picture in the CVSS AU is a coded layer video sequence start (CLVSS) picture. This ensures that a random access point (RAP) is provided for each layer of the multi-layer bitstream at the start of every coded video sequence (CVS). Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides that a display configured to display a decoded picture.

A sixth aspect relates to a system. The system includes an encoder; and a decoder in communication with the encoder, wherein the encoder or the decoder includes the decoding device, the encoding device, or the coding apparatus disclosed herein.

The system provides techniques that simplify coding by utilizing a bitstream that is constrained so that each coded video sequence start (CVSS) access unit (AU) is a complete AU and each picture in the CVSS AU is a coded layer video sequence start (CLVSS) picture. This ensures that a random access point (RAP) is provided for each layer of the multi-layer bitstream at the start of every coded video sequence (CVS). Thus, the coder/decoder (a.k.a., "codec") in video coding is improved relative to current codecs. As a practical matter, the improved video coding process offers the user a better user experience when videos are sent, received, and/or viewed.

A seventh aspect relates to a means for coding. The means for coding includes receiving means configured to receive a picture to encode or to receive a bitstream to decode; transmission means coupled to the receiving means, the transmission means configured to transmit the bitstream to a decoding means or to transmit a decoded image to a display means; storage means coupled to at least one of the receiving means or the transmission means, the storage means configured to store instructions; and processing means coupled to the storage means, the processing means configured to execute the instructions stored in the storage means to perform any of the methods disclosed herein.

The means for coding provides techniques that simplify coding by utilizing a bitstream that is constrained so that each coded video sequence start (CVSS) access unit (AU) is a complete AU and each picture in the CVSS AU is a coded layer video sequence start (CLVSS) picture. This ensures that a random access point (RAP) is provided for each layer of the multi-layer bitstream at the start of every coded video sequence (CVS). Thus, the coder/decoder (a.k.a., "codec") in video coding is improved relative to current codecs. As a practical matter, the improved video coding process offers the user a better user experience when videos are sent, received, and/or viewed.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
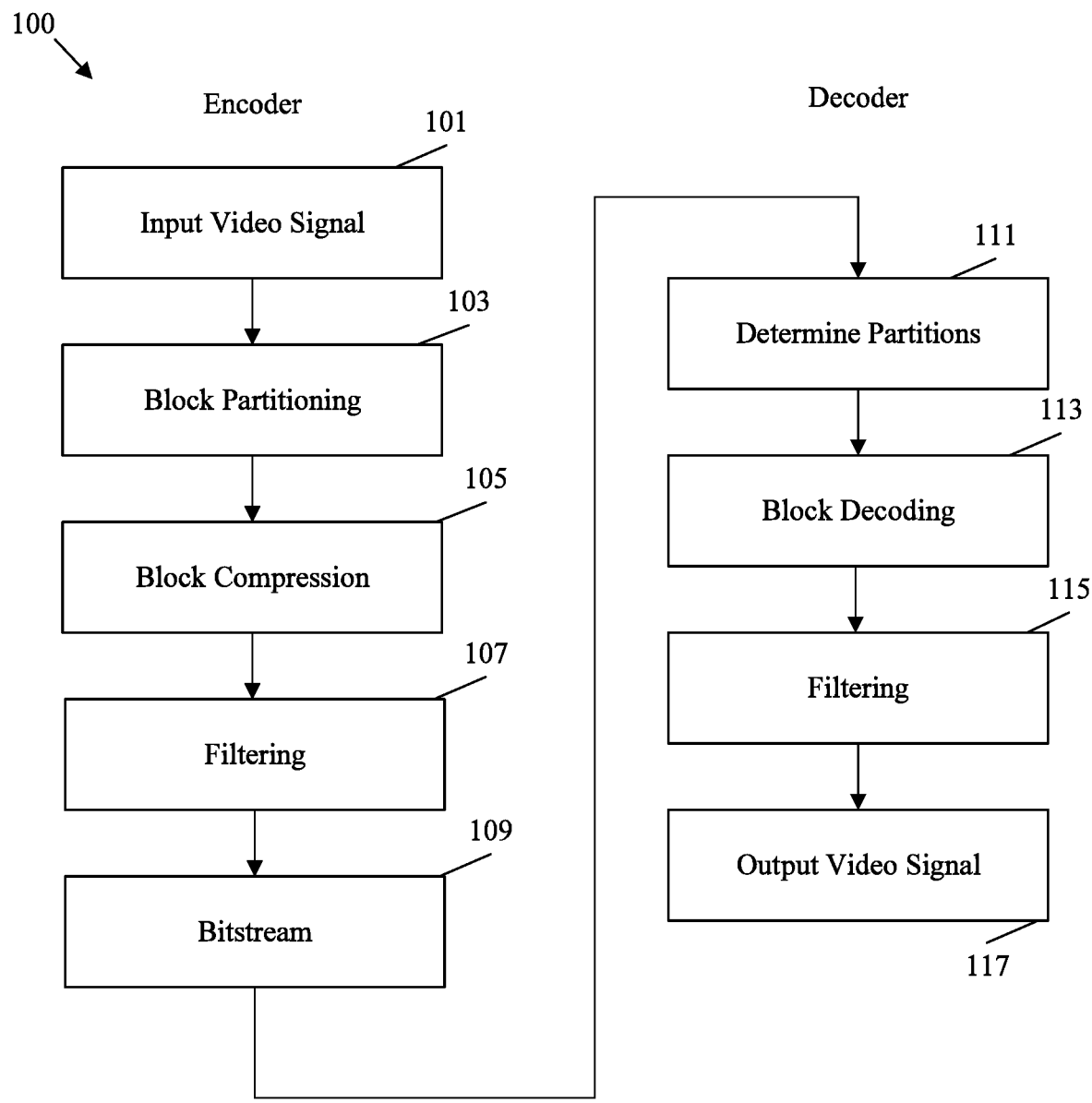
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

A bitstream is a sequence of bits including video data that is compressed for transmission between an encoder and a decoder. An encoder is a device that is configured to employ encoding processes to compress video data into a bitstream. A decoder is a device that is configured to employ decoding processes to reconstruct video data from a bitstream for display. A picture is an array of luma samples and/or an array of chroma samples that create a frame or a field thereof. A picture that is being encoded or decoded can be referred to as a current picture for clarity of discussion. A reference picture is a picture that contains reference samples that can be used when coding other pictures by reference according to inter-prediction and/or inter-layer prediction. A reference picture list is a list of reference pictures used for inter-prediction and/or inter-layer prediction. Some video coding systems utilize two reference picture lists, which can be denoted as reference picture list one and reference picture list zero. A reference picture list structure is an addressable syntax structure that contains multiple reference picture lists. Inter-prediction is a mechanism of coding samples of a current picture by reference to indicated samples in a reference picture that is different from the current picture where the reference picture and the current picture are in the same layer. A reference picture list structure entry is an addressable location in a reference picture list structure that indicates a reference picture associated with a reference picture list. A slice header is a part of a coded slice containing data elements pertaining to all video data within a tile represented in the slice. A sequence parameter set (SPS) is a parameter set that contains data related to a sequence of pictures. A picture parameter set (PPS) is a syntax structure containing syntax elements that apply to zero or more entire coded pictures as determined by a syntax element found in each picture header.

A video parameter set (VPS) includes decoding dependency or information for reference picture set construction of enhancement layers. The VPS provides an overall perspective or view of a scalable sequence, including what types of operation points are provided, the profile, tier, and level of the operation points, and some other high-level properties of the bitstream that can be used as the basis for session negotiation and content selection, etc.

A flag is a variable or single-bit syntax element that can take one of the two possible values: 0 and 1. An access unit (AU) is a set of one or more coded pictures associated with the same display time (e.g., the same picture order count) for output from a decoded picture buffer (DPB) (e.g., for display to a user). An access unit delimiter (AUD) is an indicator or data structure used to indicate the start of an AU or the boundary between AUs. A decoded video sequence is a sequence of pictures that have been reconstructed by a decoder in preparation for display to a user.

A coded video sequence (CVS) is a sequence of access units (AUs) that include, in decoding order, a coded video sequence start (CVSS) AU, followed by zero or more AUs that are not CVSS AUs, including all subsequent AUs up to but not including any subsequent AU that is a CVSS AU. A CVSS AU is an AU in which there is a prediction unit (PU) for each layer specified by the video parameter set (VPS) and the coded picture in each PU is a coded layer video start sequence (CLVSS) picture. In an embodiment, each picture is within an AU. A PU is a set of network abstraction layer (NAL) units that are associated with each other according to a specified classification rule, are consecutive in decoding order, and contain exactly one coded picture.

An intra random access point (IRAP) picture is a coded picture for which all VCL NAL units have the same value of nal_unit_type in the range of IDR_W_RADL to CRA_NUT, inclusive. The decoding process for a coded video sequence always starts at an IRAP. The IRAP pictures provide a random access point (RAP).

A gradual decoding refresh (GDR) picture is a picture for which each VCL NAL unit has nal_unit_type equal to GDR_NUT. (GDR) pictures may also be considered to be IRAP pictures. The GDR picture is referred to as a CVS starting (CVSS) picture.

A picture order count (POC) is a variable that is associated with each picture, uniquely identifies the associated picture among all pictures in the CLVS, and, when the associated picture is to be output from the DPB, indicates the position of the associated picture in output order relative to the output order positions of the other pictures in the same CLVS that are to be output from the DPB.

The following acronyms are used herein: Access Unit (AU), Coding Tree Block (CTB), Coding Tree Unit (CTU), Coding Unit (CU), Coded Layer Video Sequence (CLVS), Coded Layer Video Sequence Start (CLVSS), Coded Video Sequence (CVS), Coded Video Sequence Start (CVSS), Joint Video Experts Team (JVET), Motion-Constrained Tile Set (MCTS), Maximum Transfer Unit (MTU), Network Abstraction Layer (NAL), Output Layer Set (OLS), Picture Order Count (POC), Picture Parameter Set (PPS), Random Access Point (RAP), Raw Byte Sequence Payload (RBSP), Sequence Parameter Set (SPS), Video Parameter Set (VPS), Versatile Video Coding (VVC), and Working Draft (WD).

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, deblocking filters, adaptive loop filters, and SAO filters may be applied to the frames to remove blocking artifacts. Once the frames are filtered, the video signal can be output to a display at step 117 for viewing by an end user.

Figure 2:
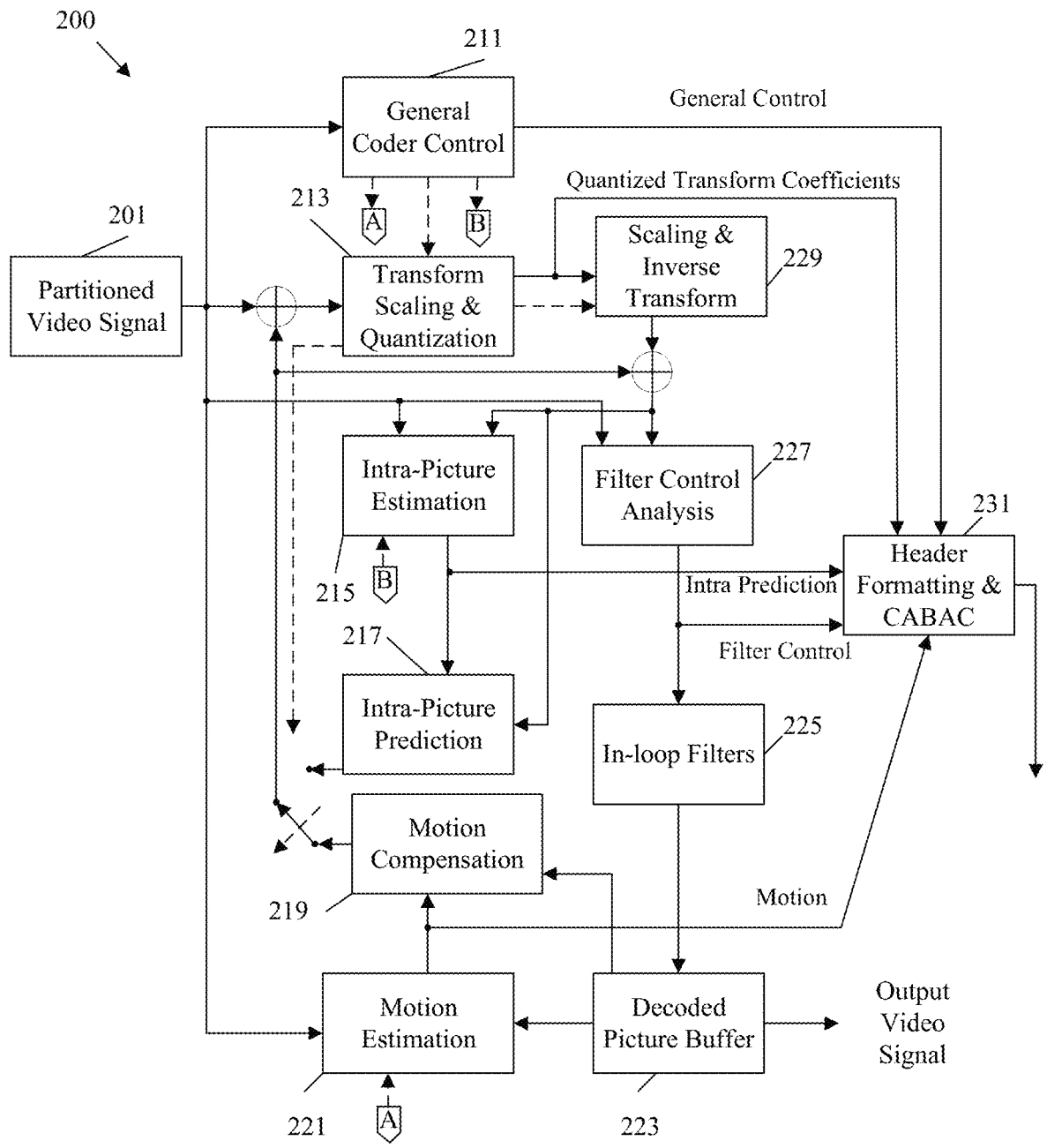
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
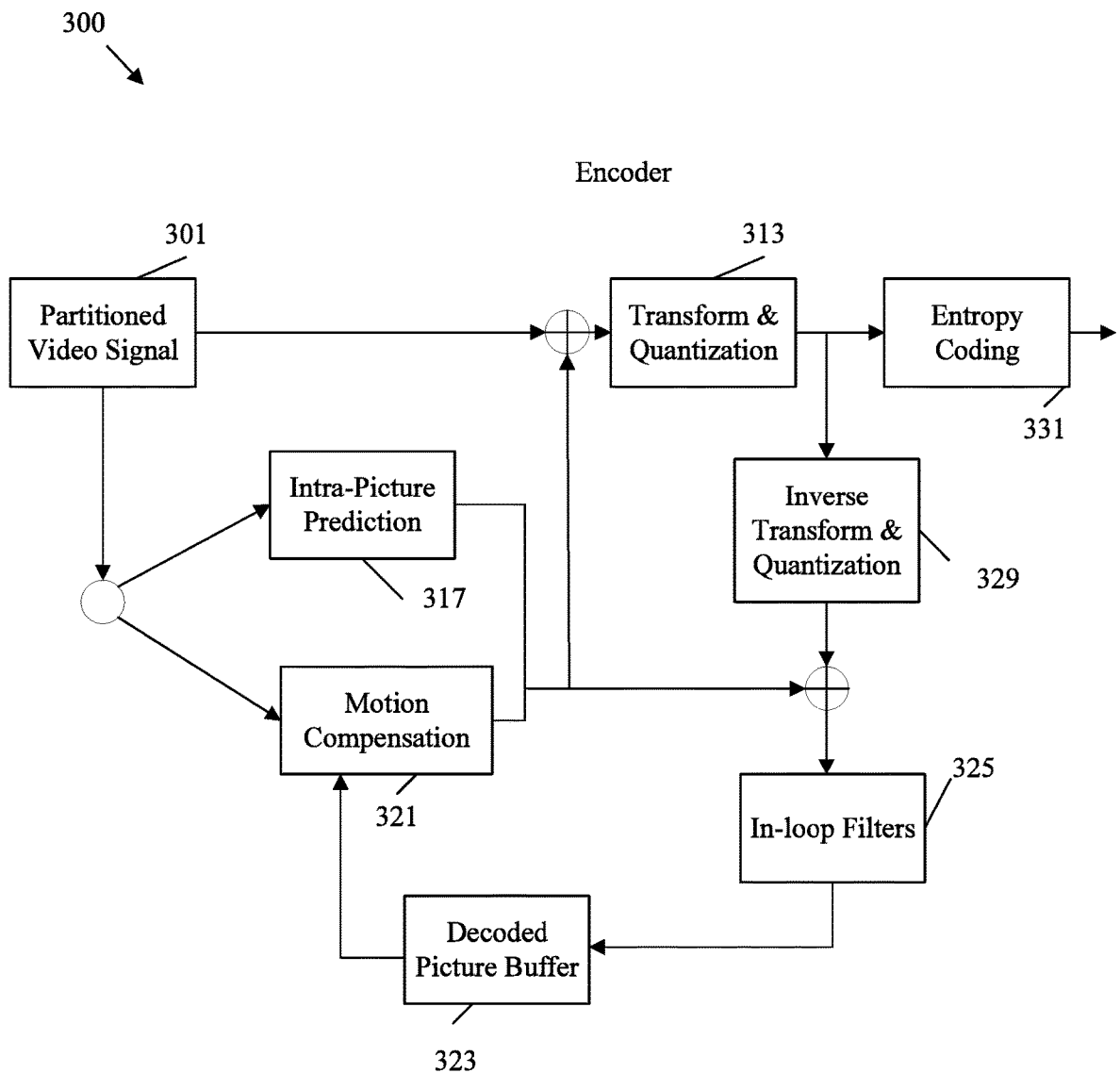
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
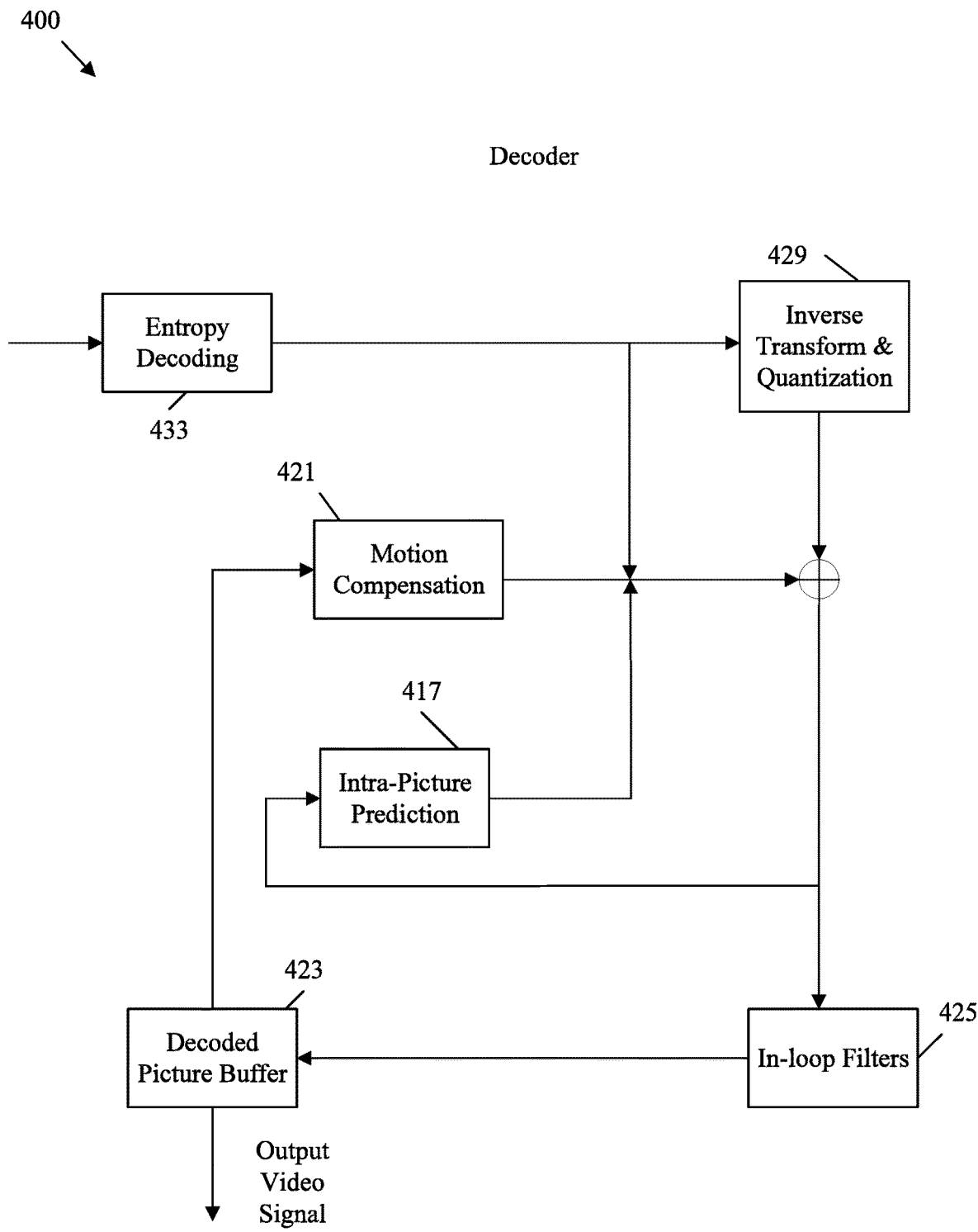
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Keeping the above in mind, video compression techniques perform spatial (intra-picture) prediction and/or temporal (inter-picture) prediction to reduce or remove redundancy inherent in video sequences. For block-based video coding, a video slice (i.e., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Image and video compression has experienced rapid growth, leading to various coding standards. Such video coding standards include ITU-T H.261, International Organization for Standardization/International Electrotechnical Commission (ISO/IEC) MPEG-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and 3D AVC (3D-AVC). HEVC includes extensions such as Scalable HEVC (SHVC), Multiview HEVC (MV-HEVC), and 3D HEVC (3D-HEVC).

There is also a new video coding standard, named Versatile Video Coding (VVC), being developed by the joint video experts team (WET) of ITU-T and ISO/IEC. While the VVC standard has several working drafts, one Working Draft (WD) of VVC in particular, namely B. Bross, J. Chen, and S. Liu, "Versatile Video Coding (Draft 5)," JVET-N1001-v3, 13th JVET Meeting, Mar. 27, 2019 (VVC Draft 5) is referenced herein.

Layered video coding is also referred to as scalable video coding or video coding with scalability. Scalability in video coding usually is supported by using multi-layer coding techniques. A multi-layer bitstream comprises a base layer (BL) and one or more enhancement layers (ELs). An example of scalabilities includes spatial scalability, quality/signal-to-noise (SNR) scalability, multi-view scalability, etc. When a multi-layer coding technique is used, a picture or a part thereof may be coded (1) without using a reference picture, i.e., using intra prediction; (2) by referencing to reference pictures that are in the same layer, i.e., using inter prediction; or (3) by referencing to reference pictures that are in other layer(s), i.e., using inter-layer prediction. A reference picture used for inter-layer prediction of the current picture is referred to as an inter-layer reference picture (ILRP).

Figure 5:
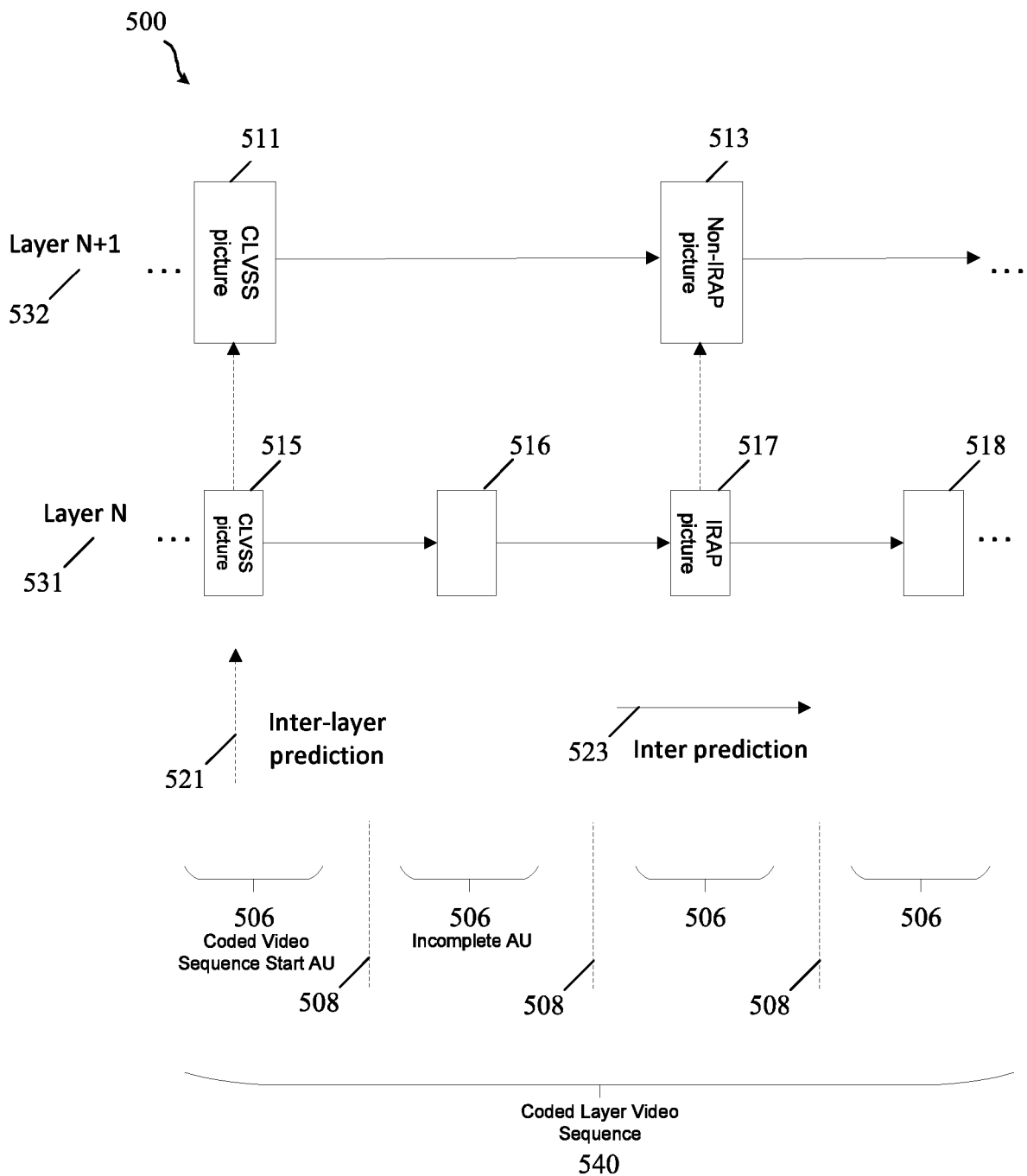
FIG. 5 illustrates an example of multi-layer coding for spatial scalability.

FIG. 5 is a schematic diagram illustrating an example of layer based prediction 500, for example as performed to determine motion vectors (MVs) at block compression step 105, block decoding step 113, motion estimation component 221, motion compensation component 219, motion compensation component 321, and/or motion compensation component 421. Layer based prediction 500 is compatible with unidirectional inter-prediction and/or bidirectional inter-prediction, but is also performed between pictures in different layers.

Layer based prediction 500 is applied between pictures 511, 513 and pictures 515, 517 in different layers. In the example shown, pictures 511 and 513 are part of layer N+1 532 and pictures 515, 516, 517, and 518 are part of layer N 531. A layer, such as layer N 531 and/or layer N+1 532, is a group of pictures that are all associated with a similar value of a characteristic, such as a similar size, quality, resolution, signal to noise ratio, capability, etc. In the example shown, layer N+1 532 is associated with a larger image size than layer N 531. Accordingly, pictures 511 and 513 in layer N+1 532 have a larger picture size (e.g., larger height and width and hence more samples) than pictures 515, 516, 517, and 518 in layer N 531 in this example. However, such pictures can be separated between layer N+1 532 and layer N 531 by other characteristics. While only two layers, layer N+1 532 and layer N 531, are shown, a set of pictures can be separated into any number of layers based on associated characteristics. Layer N+1 532 and layer N 531 may also be denoted by a layer identifier (ID). A layer ID is an item of data that is associated with a picture and denotes the picture is part of an indicated layer. Accordingly, each picture 511, 513, and 515-518 may be associated with a corresponding layer ID to indicate which layer N+1 532 or layer N 531 includes the corresponding picture.

Pictures 511, 513, and 515-518 in different layers 531-532 are configured to be displayed in the alternative. As such, pictures 511, 513, and 515-518 in different layers 531-532 can share the same temporal identifier (ID) and can be included in the same AU. As used herein, an AU is a set of one or more coded pictures associated with the same display time for output from a DPB. For example, a decoder may decode and display picture 515 at a current display time if a smaller picture is desired or the decoder may decode and display picture 511 at the current display time if a larger picture is desired. As such, pictures 511 and 513 at higher layer N+1 532 contain substantially the same image data as corresponding pictures 515 and 517 at lower layer N 531 (notwithstanding the difference in picture size). Specifically, picture 511 contains substantially the same image data as picture 515, picture 513 contains substantially the same image data as picture 517, etc.

Pictures 511, 513, and 515-518 can be coded by reference to other pictures 511, 513-518 in the same layer N 531 or N+1 532. Coding a picture in reference to another picture in the same layer results in inter-prediction 523, which is compatible unidirectional inter-prediction and/or bidirectional inter-prediction. Inter-prediction 523 is depicted by solid line arrows. For example, picture 516 may be coded by employing inter-prediction 523 using one or two of pictures 515 and/or 517 in layer N+1 532 as a reference, where one picture is referenced for unidirectional inter-prediction and/or two pictures are referenced for bidirectional inter-prediction. When a picture is used as a reference for another picture in the same layer when performing inter-prediction 523, the picture may be referred to as a reference picture. For example, picture 511 may be a reference picture used to code picture 513 according to inter-prediction 523. Inter-prediction 523 can also be referred to as intra-layer prediction in a multi-layer context. As such, inter-prediction 523 is a mechanism of coding samples of a current picture by reference to indicated samples in a reference picture that are different from the current picture where the reference picture and the current picture are in the same layer.

Pictures 511, 513, and 515-518 can also be coded by reference to other pictures 511, 513, and 515-518 in different layers. This process is known as inter-layer prediction 521, and is depicted by dashed arrows. Inter-layer prediction 521 is a mechanism of coding samples of a current picture by reference to indicated samples in a reference picture where the current picture and the reference picture are in different layers and hence have different layer IDs. For example, a picture in a lower layer N 531 can be used as a reference picture to code a corresponding picture at a higher layer N+1 532. As a specific example, picture 511 can be coded by reference to picture 515 according to inter-layer prediction 521. In such a case, the picture 515 is used as an inter-layer reference picture. An inter-layer reference picture is a reference picture used for inter-layer prediction 521. In most cases, inter-layer prediction 521 is constrained such that a current picture, such as picture 511, can only use inter-layer reference picture(s) that are included in the same AU and that are at a lower layer, such as picture 515. When multiple layers (e.g., more than two) are available, inter-layer prediction 521 can encode/decode a current picture based on multiple inter-layer reference picture(s) at lower levels than the current picture.

A video encoder can employ layer based prediction 500 to encode pictures 511, 513, and 515-518 via many different combinations and/or permutations of inter-prediction 523 and inter-layer prediction 521. For example, picture 515 may be coded according to intra-prediction. Pictures 516-518 can then be coded according to inter-prediction 523 by using picture 515 as a reference picture. Further, picture 511 may be coded according to inter-layer prediction 521 by using picture 515 as an inter-layer reference picture. Picture 513 can then be coded according to inter-prediction 523 by using picture 511 as a reference picture. As such, a reference picture can serve as both a single layer reference picture and an inter-layer reference picture for different coding mechanisms. By coding higher layer N+1 532 pictures based on lower layer N 531 pictures, the higher layer N+1 532 can avoid employing intra-prediction, which has much lower coding efficiency than inter-prediction 523 and inter-layer prediction 521. As such, the poor coding efficiency of intra-prediction can be limited to the smallest/lowest quality pictures, and hence limited to coding the smallest amount of video data. The pictures used as reference pictures and/or inter-layer reference pictures can be indicated in entries of reference picture list(s) contained in a reference picture list structure.

Each AU 506 in FIG. 5 may contain one or several pictures. For example, one AU 506 may contain pictures 511 and 515. Another AU 506 may contain only picture 516. Indeed, each AU 506 is a set of one or more coded pictures associated with the same display time (e.g., the same temporal ID) for output from a decoded picture buffer (DPB) (e.g., for display to a user). Each access unit delimiter (AUD) 508 is an indicator or data structure used to indicate the start of an AU (e.g., AU 506) or the boundary between AUs.

In an embodiment, an AU 506 containing a picture in every layer is referred to as a complete AU. An example of a complete AU is the AU 506 containing pictures 511 and 515 or the AU 506 containing pictures 513 and 517. In an embodiment, an AU 506 not containing a picture in every layer is referred to as an incomplete AU. An example of an incomplete AU is the AU 506 containing picture 516 or the AU 506 containing picture 518. Using both complete and incomplete AUs in a CLVS 540 allows different layers to have different bitrates. By way of example, layer 531 has four pictures 515-518 compared to the two pictures 511, 513 of layer 532. Thus, layer 531 has a higher bitrate relative to layer 532. In practical applications, a different number of layers may be included in the CLVS 540 and the different layers may have a different number of pictures in order to support different bitrates.

In an embodiment, the AU 506 at the start or beginning of the coded layer video sequence (CLVS) 540 is referred to a coded video sequence start (CVSS) AU. That is, the initial or first AU 506 in the CVS 540 is a CVSS AU. In an embodiment, the pictures 511, 515 in each layer 531, 532 of the AU 506 designated as the CVSS AU are coded layer video sequence start (CLVSS) pictures. That is, the CVSS AU contains a CLVSS picture (e.g., picture 515) in one layer (e.g., layer N 531) and another CLVSS picture (e.g., picture 511) in another layer (e.g., layer N+1 532). A CLVSS picture is, for example, an intra random access point (TRAP) picture, a gradual decoding refresh picture, a clean random access (CRA) picture, an instantaneous decoder refresh (IDR) picture, a Broken Link Access (BLA) picture, or another type of random access point picture.

In an embodiment, some of AUs 506 (excluding the CVSS AU) may contain an TRAP picture (e.g., picture 517) in one layer (e.g., layer N 531) and a non-TRAP picture (e.g., picture 513) in another layer (e.g., layer N+1 532). That is, the same AU contains both IRAP and non-IRAP pictures in different layers. While one of the AUs 506 in FIG. 5 is shown containing one IRAP picture and one non-IRAP picture, a different number of IRAP and non-IRAP pictures may be included in the AU in practical applications when the AU contains more than two layers. IRAP pictures are discussed in further detail, below.

Previous H.26x video coding families have provided support for scalability in separate profile(s) from the profile(s) for single-layer coding. Scalable video coding (SVC) is the scalable extension of the AVC/H.264 that provides support for spatial, temporal, and quality scalabilities. For SVC, a flag is signaled in each macroblock (MB) in EL pictures to indicate whether the EL MB is predicted using the collocated block from a lower layer. The prediction from the collocated block may include texture, motion vectors, and/or coding modes. Implementations of SVC cannot directly reuse unmodified H.264/AVC implementations in their design. The SVC EL macroblock syntax and decoding process differs from H.264/AVC syntax and decoding process.

Scalable HEVC (SHVC) is the extension of the HEVC/H.265 standard that provides support for spatial and quality scalabilities, multiview HEVC (MV-HEVC) is the extension of the HEVC/H.265 that provides support for multi-view scalability, and 3D HEVC (3D-HEVC) is the extension of the HEVC/H.264 that provides supports for three dimensional (3D) video coding that is more advanced and more efficient than MV-HEVC. Note that the temporal scalability is included as an integral part of the single-layer HEVC codec. The design of the multi-layer extension of HEVC employs the idea where the decoded pictures used for inter-layer prediction come only from the same access unit (AU) and are treated as long-term reference pictures (LTRPs), and are assigned reference indices in the reference picture list(s) along with other temporal reference pictures in the current layer. Inter-layer prediction (ILP) is achieved at the prediction unit (PU) level by setting the value of the reference index to refer to the inter-layer reference picture(s) in the reference picture list(s).

Notably, both reference picture resampling and spatial scalability features call for resampling of a reference picture or part thereof. Reference picture resampling (RPR) can be realized at either the picture level or coding block level. However, when RPR is referred to as a coding feature, it is a feature for single-layer coding. Even so, it is possible or even preferable from a codec design point of view to use the same resampling filter for both the RPR feature of single-layer coding and the spatial scalability feature for multi-layer coding.

The latest VVC draft supports layered video coding. A VVC bitstream can include multiple layers. The layers can be all independent from each other, i.e., each layer is coded without using inter-layer prediction (ILP). In this case, the layers are also referred to as simulcast layers. It is also possible that some of the layers are coded using ILP. A flag in the VPS is used to indicate whether layers are simulcast layers or whether some layers use ILP. When some layers use ILP, the layer dependency relationship among layers is also signaled in the VPS.

Unlike SHVC and MV-HEVC, the latest VVC draft does not specify OLSs. An OLS is a set of layers for which one or more layers are specified as the output layers. An output layer is a layer of an output layer set that is output.

In the latest VVC draft, when the layers are simulcast layers, it is specified that only one layer may be selected for decoding and output. In the latest VVC draft, when some layers use ILP, all of the layers in the bitstream are specified to be decoded but only certain layers are specified to be output layers. The output layers may be indicated to be 1) only the highest layer, 2) all the layers, or 3) the highest layer plus a set of indicated lower layers.

Figure 6:
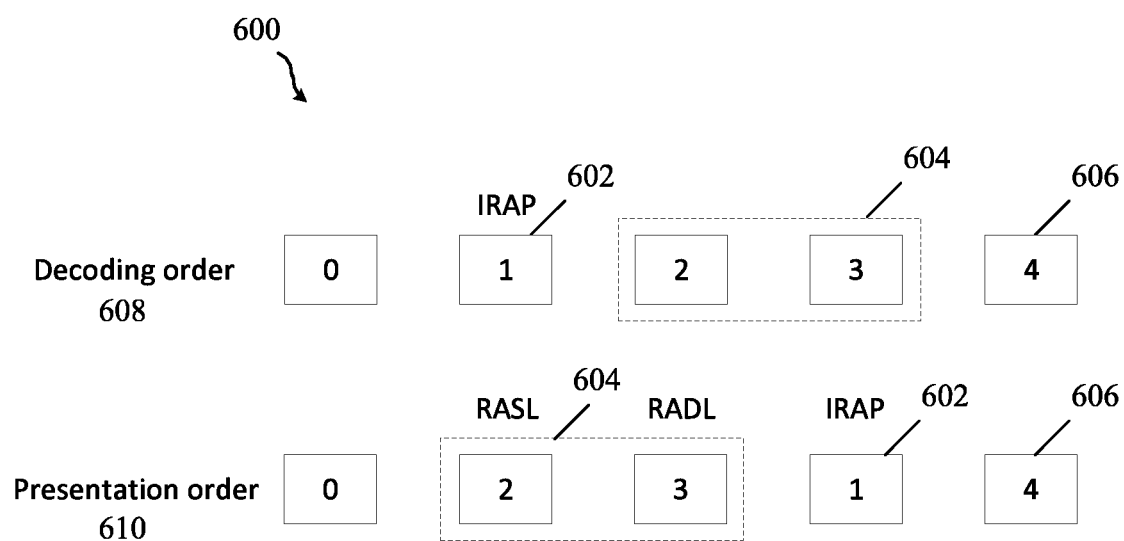
FIG. 6 is a representation of a relationship between an IRAP picture relative to leading pictures and trailing pictures in a decoding order and a presentation order.

FIG. 6 is a representation 600 of a relationship between an intra random access point (IRAP) picture 602 relative to leading pictures 604 and trailing pictures 606 in a decoding order 608 and a presentation order 610 (a.k.a., an output order). In an embodiment, the IRAP picture 602 is referred to as a clean random access (CRA) picture or as an instantaneous decoder refresh (IDR) picture with random access decodable (RADL) picture. In HEVC, IDR pictures, CRA pictures, and Broken Link Access (BLA) pictures are all considered IRAP pictures 602. For VVC, during the 12th NET meeting in October 2018, it was agreed to have both IDR and CRA pictures as IRAP pictures. In an embodiment, Broken Link Access (BLA) and Gradual Decoder Refresh (GDR) pictures may also be considered to be IRAP pictures. The decoding process for a coded video sequence always starts at an IRAP. The IRAP pictures provide a random access point (RAP).

As shown in FIG. 6, the leading pictures 604 (e.g., pictures 2 and 3) follow the IRAP picture 602 in the decoding order 608, but precede the IRAP picture 602 in the presentation order 610. The trailing picture 606 follows the IRAP picture 602 in both the decoding order 608 and in the presentation order 610. While two leading pictures 604 and one trailing picture 606 are depicted in FIG. 6, those skilled in the art will appreciate that more or fewer leading pictures 604 and/or trailing pictures 606 may be present in the decoding order 608 and the presentation order 610 in practical applications.

The leading pictures 604 in FIG. 6 have been divided into two types, namely random access skipped leading (RASL) and RADL. When decoding starts with the IRAP picture 602 (e.g., picture 1), the RADL picture (e.g., picture 3) can be properly decoded; however, the RASL picture (e.g., picture 2) cannot be properly decoded. Thus, the RASL picture is discarded. In light of the distinction between RADL and RASL pictures, the type of leading picture 604 associated with the TRAP picture 602 should be identified as either RADL or RASL for efficient and proper coding. In HEVC, when RASL and RADL pictures are present, it is constrained that for RASL and RADL pictures that are associated with the same TRAP picture 602, the RASL pictures shall precede the RADL pictures in presentation order 610.

An TRAP picture 602 provides the following two important functionalities/benefits. Firstly, the presence of an IRAP picture 602 indicates that the decoding process can start from that picture. This functionality allows a random access feature in which the decoding process starts at that position in the bitstream, not necessarily the beginning of the bitstream, as long as an TRAP picture 602 is present at that position. Secondly, the presence of an IRAP picture 602 refreshes the decoding process such that a coded picture starting at the IRAP picture 602, excluding RASL pictures, are coded without any reference to previous pictures. Having an IRAP picture 602 present in the bitstream consequently would stop any error that may happen during decoding of coded pictures prior to the TRAP picture 602 to propagate to the TRAP picture 602 and those pictures that follow the TRAP picture 602 in decoding order 608.

While TRAP pictures 602 provide important functionalities, they come with a penalty to the compression efficiency. The presence of an TRAP picture 602 causes a surge in bitrate. This penalty to the compression efficiency is due to two reasons. Firstly, as an IRAP picture 602 is an intra-predicted picture, the picture itself would require relatively more bits to represent when compared to other pictures (e.g., leading pictures 604, trailing pictures 606) that are inter-predicted pictures. Secondly, because the presence of an IRAP picture 602 breaks temporal prediction (this is because the decoder would refresh the decoding process, in which one of the actions of the decoding process for this is to remove previous reference pictures in the decoded picture buffer (DPB)), the TRAP picture 602 causes the coding of pictures that follow the TRAP picture 602 in decoding order 608 to be less efficient (i.e., needs more bits to represent) because they have less reference pictures for their inter-prediction coding.

Among the picture types that are considered TRAP pictures 602, the IDR picture in HEVC has different signaling and derivation when compared to other picture types. Some of the differences are as follows.

For signaling and derivation of a picture order count (POC) value of an IDR picture, the most significant bit (MSB) part of the POC is not derived from the previous key picture but simply set to be equal to 0.

For signaling information needed for reference picture management, the slice header of an IDR picture does not contain information needed to be signaled to assist reference picture management. For other picture types (i.e., CRA, Trailing, temporal sub-layer access (TSA), etc.), information such as the reference picture set (RPS) described below or other forms of similar information (e.g., reference picture lists) are needed for the reference pictures marking process (i.e., the process to determine the status of reference pictures in the decoded picture buffer (DPB), either used for reference and unused for reference). However, for the IDR picture, such information does not need to be signaled because the presence of IDR indicates that the decoding process shall simply mark all reference pictures in the DPB as unused for reference.

In HEVC and VVC, IRAP pictures and leading pictures are given different NAL unit types (NUTs) so that they can be easily identified by system level applications. For example, a video splicer needs to understand coded picture types without having to understand too much detail of syntax element in the coded bitstream, particularly to identify IRAP pictures from non-IRAP pictures and to identify leading pictures, including determining RASL and RADL pictures, from trailing pictures. Trailing pictures are those pictures that are associated with an IRAP picture and follow the IRAP picture in output order. A picture associated with a particular IRAP picture follows the particular IRAP picture in decoding order and precedes any other IRAP picture in decoding order. For this, giving IRAP and leading pictures their own NAL unit type may help such applications.

In HEVC, every picture has a POC value assigned to it, denoted as PicOrderCntVal. The POC has three main uses: to uniquely identify pictures, to indicate the output position relative to other pictures in the same CVS, and to perform motion vector scaling within the lower-level video coding layer (VCL) decoding process. All pictures in the same CVS have a unique POC value. Pictures from different CVSs may share the same POC value, but pictures can still be uniquely identified since there are no possibilities to mix pictures from one CVS with any picture of another CVS. Gaps in POC values are allowed in a CVS. That is, the POC value difference between two pictures that are consecutive in output order can differ by more than one (and in fact the amount by which the POC values for consecutive pictures may differ can vary arbitrarily).

In HEVC, the POC value of a picture is signaled using a codeword in the slice header. The range of allowed POC values is from $-2^{31}$ to $2^{31}-1$, so in order to save bits in the slice header, only the least significant bits of the POC value (POC LSB) are signaled. The number of bits to use for POC LSB can be between 4 and 16, and are signaled in the SPS. The rest of the bits are the most significant POC value bits (POC MSB). Because only the POC LSB are signaled in the slice header, the POC MSB for the current picture are derived from a previous picture, called prevTid0Pic. In order for POC derivation to work the same way even when pictures are removed, prevTid0Pic is set to the closest previous picture of temporal layer 0 that is not a RASL picture, a RADL picture, or a sub-layer non-reference picture. The decoder derives the POC MSB value by comparing the POC value of the current picture with the POC value of the prevTid0Pic picture.

Unfortunately, existing coding designs have drawbacks. For example, in SHVC and MV-HEVC, mixed IRAP and non-IRAP pictures may be included within the same access unit (e.g., picture 511 and 515 in AU 506 in FIG. 5), but the design is very complicated. Indeed, the general decoding process for this design is specified in SHVC and MV-HEVC using several pages of text in clause F.8.1 of the latest HEVC standard. The text involves the use of the many global flags/variables/lists, including NoClrasOutputFlag, LayerinitializedFlag, LayerResetFlag, FirstPicInLayerDecodedFlag, NumPredictedLayers, IdPredictedLayer, IdDirectRefLayer, NumDirectRefLayers, NumActiveRefLayerPics, NumActiveRefLayerPics0, NumActiveRefLayerPics1, etc. Many other places in SHVC and MV-HEVC that provide support for mixed TRAP and non-TRAP pictures within an access unit are also complicated. This includes the POC derivation process.

Disclosed herein are techniques that simplify coding by utilizing a bitstream that is constrained so that each coded video sequence start (CVSS) access unit (AU) is a complete AU and each picture in the CVSS AU is a coded layer video sequence start (CLVSS) picture. This ensures that a random access point (RAP) is provided for each layer of the multilayer bitstream at the start of every coded video sequence (CVS). Thus, the coder/decoder (a.k.a., "codec") in video coding is improved relative to current codecs. As a practical matter, the improved video coding process offers the user a better user experience when videos are sent, received, and/or viewed.

Figure 7:
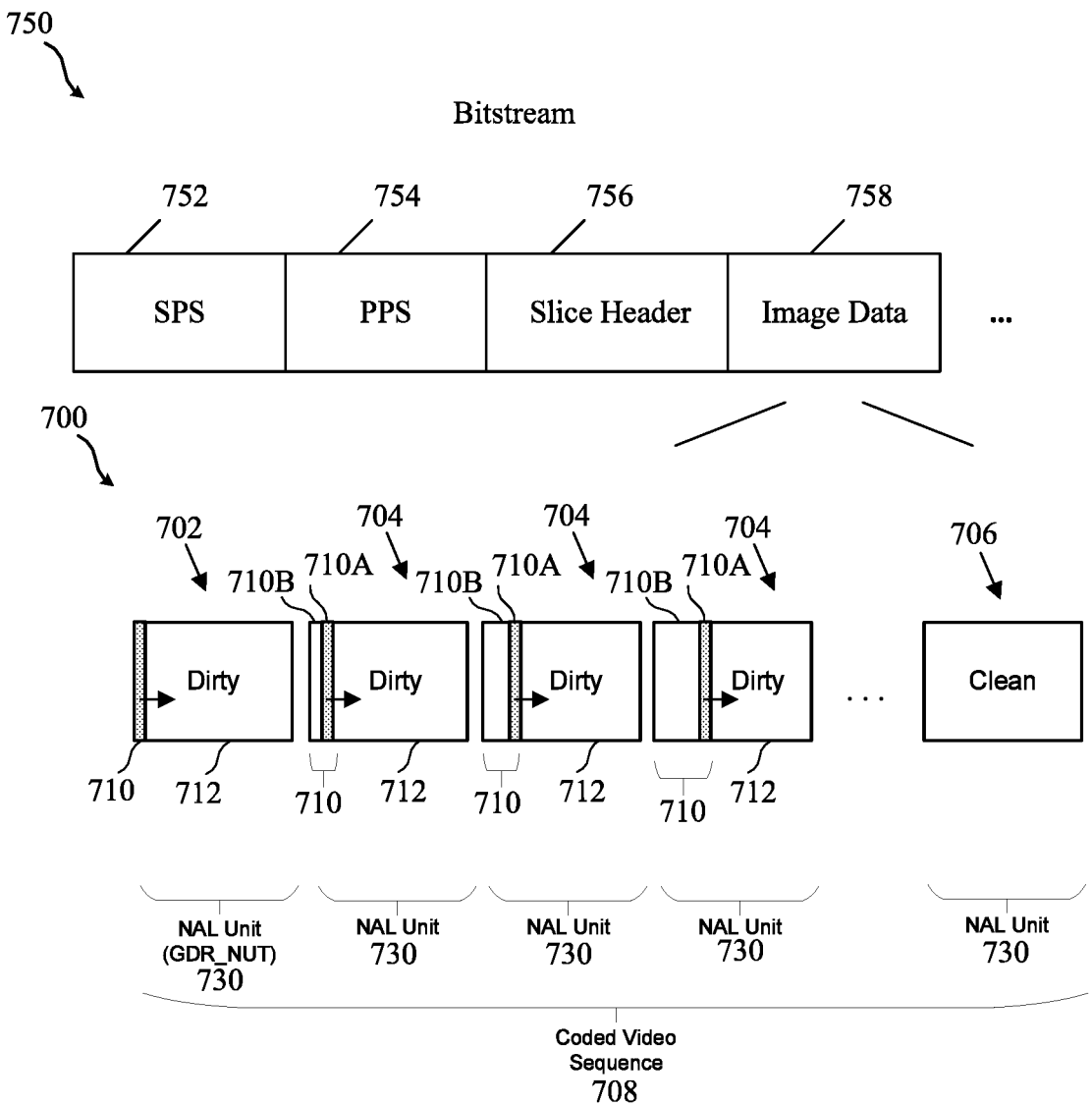
FIG. 7 illustrates a video bitstream configured to implement a gradual decoding refresh (GDR) technique.

FIG. 7 illustrates a video bitstream 750 configured to implement a gradual decoding refresh (GDR) technique 700. As used herein the video bitstream 750 may also be referred to as a coded video bitstream, a bitstream, or variations thereof. As shown in FIG. 7, the bitstream 750 comprises a sequence parameter set (SPS) 752, a picture parameter set (PPS) 754, a slice header 756, and image data 758.

The SPS 752 contains data that is common to all the pictures in a sequence of pictures (SOP). In contrast, the PPS 754 contains data that is common to the entire picture. The slice header 756 contains information about the current slice such as, for example, the slice type, which of the reference pictures will be used, and so on. The SPS 752 and the PPS 754 may be generically referred to as a parameter set. The SPS 752, the PPS 754, and the slice header 756 are types of Network Abstraction Layer (NAL) units. A NAL unit is a syntax structure containing an indication of the type of data to follow (e.g., coded video data). NAL units are classified into video coding layer (VCL) and non-VCL NAL units. The VCL NAL units contain the data that represents the values of the samples in the video pictures, and the non-VCL NAL units contain any associated additional information such as parameter sets (important data that can apply to a number of VCL NAL units) and supplemental enhancement information (timing information and other supplemental data that may enhance usability of the decoded video signal but are not necessary for decoding the values of the samples in the video pictures). Those skilled in the art will appreciate that the bitstream 750 may contain other parameters and information in practical applications.

The image data 758 of FIG. 7 comprises data associated with the images or video being encoded or decoded. The image data 758 may be simply referred to as the payload or data being carried in the bitstream 750. In an embodiment, the image data 758 comprises the CVS 708 (or CLVS) containing a GDR picture 702, one or more trailing pictures 704, and a recovery point picture 706. In an embodiment, the GDR picture 702 is referred to as a CVS starting (CVSS) picture. The CVS 708 is a coded video sequence for every coded layer video sequence (CLVS) in the video bitstream 750. Notably, the CVS and the CLVS are the same when the video bitstream 750 includes a single layer. The CVS and the CLVS are only different when the video bitstream 750 includes multiple layers. In an embodiment, the trailing pictures 704 may be considered a form of GDR picture since they precede the recovery point picture 706 in the GDR period.

In an embodiment, the GDR picture 702, the trailing pictures 704, and the recovery point picture 706 may define a GDR period in the CVS 708. In an embodiment, a decoding order begins with the GDR picture 702, continues with the trailing pictures 704, and then proceeds to the recovery picture 706.

The CVS 708 is a series of pictures (or portions thereof) starting with the GDR picture 702 and includes all pictures (or portions thereof) up to, but not including, the next GDR picture or until the end of the bitstream 750. The GDR period is a series of pictures starting with the GDR picture 702 and includes all pictures up to and including the recovery point picture 706. The decoding process for the CVS 708 always starts at the GDR picture 702.

As shown in FIG. 7, the GDR technique 700 or principle works over a series of pictures starting with the GDR picture 702 and ending with the recovery point picture 706. The GDR picture 702 contains a refreshed/clean region 710 containing blocks that have all been coded using intra prediction (i.e., intra-predicted blocks) and an un-refreshed/dirty region 712 containing blocks that have all been coded using inter prediction (i.e., inter-predicted blocks).

The trailing picture 704 immediately adjacent to the GDR picture 702 contains a refreshed/clean region 710 having a first portion 710A coded using intra prediction and a second portion 710B coded using inter prediction. The second portion 710B is coded by referencing the refreshed/clean region 710 of, for example, a preceeding picture within the GDR period of the CVS 708. As shown, the refreshed/clean region 710 of the trailing pictures 704 expands as the coding process moves or progresses in a consistent direction (e.g., from left to right), which correspondingly shrinks the un-refreshed/dirty region 712. Eventually, the recovery point picture 706, which contains only the refreshed/clean region 710, is obtained from the coding process. Notably, and as will be further discussed below, the second portion 710B of the refreshed/clean region 710, which is coded as inter-predicted blocks, may only refer to the refreshed/clean region 710 in the reference picture.

As shown in FIG. 7, slices of the GDR picture 702, the trailing pictures 704, and the recovery point picture 706 in the CVS 708 are each contained within their own VCL NAL unit 730.

In an embodiment, the VCL NAL unit 730 containing the GDR picture 702 in the CVS 708 has a GDR NAL unit type (GDR_NUT). That is, in an embodiment the VCL NAL unit 730 containing the GDR picture 702 in the CVS 708 has its own unique NAL unit type relative to the trailing pictures 704 and the recovery point picture 706. In an embodiment, the GDR_NUT permits the bitstream 750 to begin with the GDR picture 702 instead of the bitstream 750 having to begin with an intra random access point (IRAP) picture. Designating the VCL NAL unit 730 of the GDR picture 702 as a GDR_NUT may indicate to, for example, a decoder that the initial VCL NAL unit 730 in the CVS 708 contains the GDR picture 702. In an embodiment, the GDR picture 702 is the initial picture in the CVS 708. In an embodiment, the GDR picture 702 is the initial picture in the GDR period.

Figure 8:
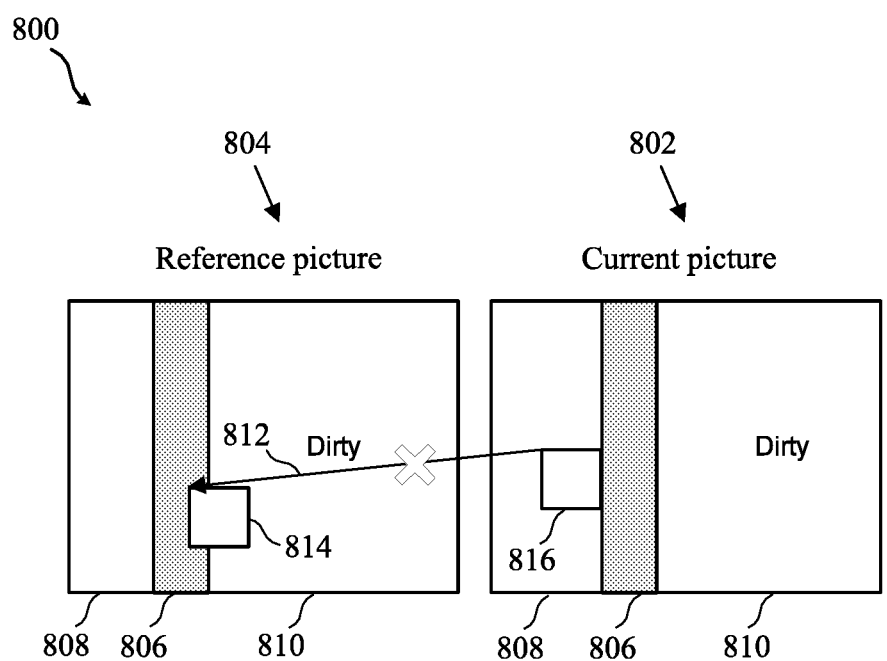
FIG. 8 is a schematic diagram illustrating an undesirable motion search when using the encoder restriction to support GDR.

FIG. 8 is a schematic diagram illustrating an undesirable motion search 800 when using the encoder restriction to support GDR. As shown, the motion search 800 depicts a current picture 802 and a reference picture 804. The current picture 802 and the reference picture 804 each include a refreshed region 806 coded with intra prediction, a refreshed region 808 coded with inter prediction, and an unrefreshed region 810. The refreshed region 806, the refreshed region 808, and the unrefreshed region 810 are slimier to the the first portion 710A of the refreshed/clean region 710, the second portion 710B of the refreshed/clean region 710, and the un-refreshed/dirty region 712 in FIG. 7.

During the motion search 800 process, the encoder is constrained or prevented from selecting any motion vector 812 that results in some of the samples of the reference block 814 being located outside the refreshed region 806. This occurs even when the reference block 814 provides the best rate-distortion cost criteria when predicting the current block 816 in the current picture 802. Thus, FIG. 8 illustrates the reason for non-optimality in the motion search 800 when using the encoder restriction for supporting GDR.

Figure 9:
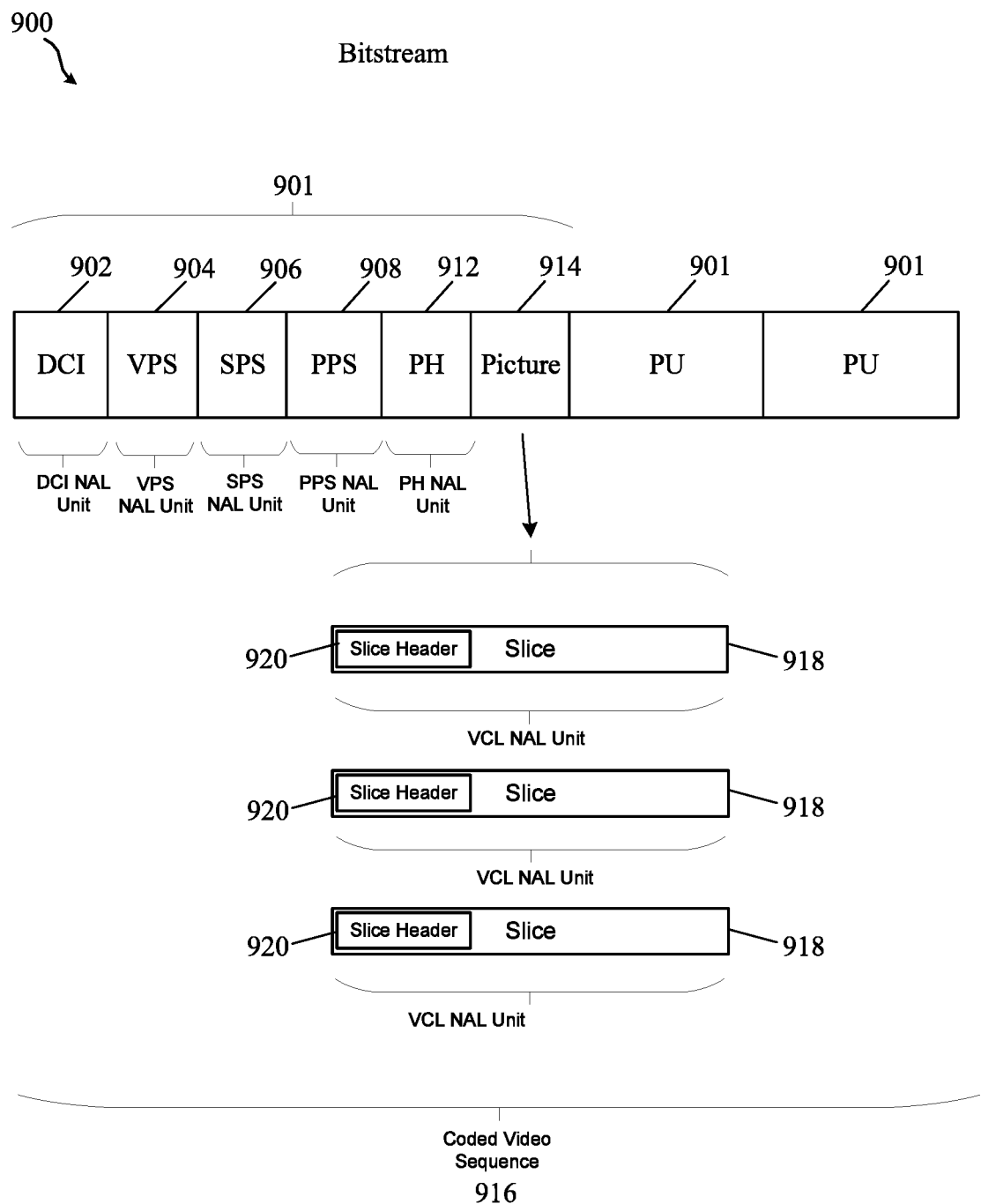
FIG. 9 illustrates an embodiment of a video bitstream.

FIG. 9 illustrates an embodiment of a video bitstream 900. As used herein the video bitstream 900 may also be referred to as a coded video bitstream, a bitstream, or variations thereof. As shown in FIG. 9, the bitstream 900 comprises at least one picture unit (PU) 901. The PU 901 may also be referred to as a layer access unit. While three of the PUs 901 are shown in FIG. 9, a different number of PUs 901 may be present in the bitstream 900 in practical applications. Each PU 901 is a set of NAL units that are associated with each other according to a specified classification rule, are consecutive in decoding order, and contain exactly one coded picture (e.g., picture 914).

In an embodiment, each PU 901 contains one or more of the following: a decoding capability information (DCI) 902, a video parameter set (VPS) 904, a sequence parameter set (SPS) 906, a picture parameter set (PPS) 908, a picture header (PH) 912, and a picture 914. Each of the DCI 902, the VPS 904, the SPS 906, and the PPS 908 may be generically referred to as a parameter set. In an embodiment, other parameter sets not shown in FIG. 9 may also be included in the bitstream 900 such as, for example, an adaption parameter set (APS), which is a syntax structure containing syntax elements that apply to zero or more slices as determined by zero or more syntax elements found in slice headers.

The DCI 902, which may also be referred to a decoding parameter set (DPS) or decoder parameter set, is a syntax structure containing syntax elements that apply to the entire bitstream. The DCI 902 includes parameters that stay constant for the lifetime of the video bitstream (e.g., bitstream 900), which can translate to the lifetime of a session. The DCI 902 can include profile, level, and sub-profile information to determine a maximum complexity interop point that is guaranteed to be never exceeded, even if splicing of video sequences occurs within a session. It further optionally includes constraint flags, which indicate that the video bitstream will be constraint of the use of certain features as indicated by the values of those flags. With this, a bitstream can be labelled as not using certain tools, which allows among other things for resource allocation in a decoder implementation. Like all parameter sets, the DCI 902 is present when first referenced, and referenced by the very first picture in a video sequence, implying that it has to be sent among the first NAL units in the bitstream. While multiple DCIs 902 can be in the bitstream, the value of the syntax elements therein cannot be inconsistent when being referenced.

The VPS 904 includes decoding dependency or information for reference picture set construction of enhancement layers. The VPS 904 provides an overall perspective or view of a scalable sequence, including what types of operation points are provided, the profile, tier, and level of the operation points, and some other high-level properties of the bitstream that can be used as the basis for session negotiation and content selection, etc.

The SPS 906 contains data that is common to all the pictures in a sequence of pictures (SOP). The SPS 906 is a syntax structure containing syntax elements that apply to zero or more entire CLVSs as determined by the content of a syntax element found in the PPS referred to by a syntax element found in each picture header. In contrast, the PPS 908 contains data that is common to the entire picture. The PPS 908 is a syntax structure containing syntax elements that apply to zero or more entire coded pictures as determined by a syntax element found in each picture header (e.g., PH 912).

In an embodiment, the SPS 906 contains a first flag 930, which is a POC MSB flag designated as spspoc_msb_cycle_flag. When the first flag 930 has a first value (e.g., 1), the first flag 930 specifies that a header (e.g., the picture header 912) contains a second flag 940, which is another POC MSB flag designated as ph_poc_msb_cycle_present_flag. When the first flag 930 has a second value (e.g., 0), the first flag 930 specifies that the header (e.g., the picture header 912) does not contain the second flag 940. As used herein, the second flag 940 may be referred to as a ph_poc_msb_cycle_present_flag syntax element.

The SPS 906 also contains an indicator of a length 950 of the POC MSB value when the POC MSB value is contained in the header referring to the SPS 906. In an embodiment, the indicator of the length 950 is designated as sps_poc_msb_cycle_len_minus1. In an embodiment, sp_spoc_msb_cycle_len_minus1, plus 1, specifies the length, in bits, of the POC MSB value when the POC MSB value is present in the header referring to the SPS. In an embodiment, the value of the indicator is in a range of zero (0) to 32—sps_log 2_max_pic_order_cnt_lsb_minus4-5, inclusive. sps_log 2_max_pic_order_cnt_lsb_minus4 specifies the value of the variable MaxPicOrderCntLsb (e.g., the maximum picture order count LSB) used in the decoding process for picture order count as follows: MaxPicOrderCntLsb=$2^{(sps\_log\ 2\_max\_pic\_order\_cnt\_lsb\_minus4+4)}$, where the value of sps_log 2_max_pic_order_cnt_lsb_minus4 shall be in the range of 0 to 12, inclusive.

The second flag 940 specifies whether a POC MSB value 960 is present in the header. When the second flag 940 has a first value (e.g., 1), the second flag 940 specifies that the POC MSB value 960 is present in the header (e.g., the picture header 912). When the second flag 940 has a second value (e.g., 0), the second flag 940 specifies that the POC MSB value 960 is not present in the header. In an embodiment, the POC MSB value 960 may be referred to as POC MSB value syntax element or elements.

The POC MSB value 960 specifies the value of the POC MSB cycle of a current picture (e.g., picture 914). In an embodiment, the POC MSB value 960 is designated as ph_poc_msb_cycle_val. Thus, the POC MSB value 960 is explicitly signaled in the bitstream 900 instead of being derived based on a previous picture. In an embodiment, the POC MSB value signaled in the bitstream is used to obtain a POC value. In an embodiment, the POC value is determined by concatenating the POC MSB value and a POC LSB, which may also be signaled in the bitstream 900.

Each coded picture is associated with a picture order count variable, denoted as PicOrderCntVal. PicOrderCntVal is derived as follows: PicOrderCntVal=PicOrderCntMsb+ph_pic_order_cnt_lsb, where PicOrderCntMsb is the POC MSB and ph_pic_order_cnt_lsb is the POC LSB.

As will be more fully explained below, use of the aforementioned flags allows for unsynchronized IRAP pictures across layers. The POC handling described herein ensures that the POC values of all pictures within an AU are the same. To effectuate this, POC MSB values are signaled (instead of being derived) for TRAP pictures, i.e., IDR, CRA, and GDR pictures. This allows a significantly simpler design for POC derivation compared to the mixed POC resetting and POC MSB signaling mechanism in the SHVC and MV-HEVC.

The DCI 902, the VPS 904, the SPS 906, and the PPS 908 are contained in different types of Network Abstraction Layer (NAL) units. A NAL unit is a syntax structure containing an indication of the type of data to follow (e.g., coded video data). NAL units are classified into video coding layer (VCL) and non-VCL NAL units. The VCL NAL units contain the data that represents the values of the samples in the video pictures, and the non-VCL NAL units contain any associated additional information such as parameter sets (important data that can apply to a number of VCL NAL units) and supplemental enhancement information (timing information and other supplemental data that may enhance usability of the decoded video signal but are not necessary for decoding the values of the samples in the video pictures).

In an embodiment, the DCI 902 is contained in a non-VCL NAL unit designated as a DCI NAL unit or a DPS NAL unit. That is, the DCI NAL unit has a DCI NAL unit type (NUT) and the DPS NAL unit has a DPS NUT. In an embodiment, the VPS 904 is contained in a non-VCL NAL unit designated as a VPS NAL unit. Therefore, the VPS NAL unit has a VPS NUT. In an embodiment, the SPS 906 is a non-VCL NAL unit designated as a SPS NAL unit. Therefore, the SPS NAL unit has an SPS NUT. In an embodiment, the PPS 908 is contained in a non-VCL NAL unit designated as a PPS NAL unit. Therefore, the PPS NAL unit has a PPS NUT.

The PH 912 is a syntax structure containing syntax elements that apply to all slices (e.g., slices 918) of a coded picture (e.g., picture 914). In an embodiment, the PH 912 is in a new type of non-VCL NAL unit designated a PH NAL unit. Therefore, the PH NAL unit has a PH NUT (e.g., PH NUT). In an embodiment, there is one and only one PH 912 included in each PU 901. That is, the PU 901 contains a single or lone PH 912. In an embodiment, exactly one PH NAL unit is present for each picture 914 in the bitstream 900.

In an embodiment, the PH NAL unit associated with the PH 912 has a temporal ID and a layer ID. The temporal ID indicates the position of the PH NAL unit, in time, relative to the other PH NAL units in the bitstream (e.g., bitstream 900). The layer ID indicates the layer (e.g., layer 531 or layer 532) that contains the PH NAL unit. In an embodiment, the temporal ID is similar to, but different from, the POC. The POC uniquely identifies each picture in order. In a single layer bitstream, temporal ID and POC would be the same. In a multi-layer bitstream (e.g., see FIG. 5), pictures in the same AU would have different POCs, but the same temporal ID.

In an embodiment, the PH NAL unit precedes the VCL NAL unit containing the first slice 918 of the associated picture 914. This establishes the association between the PH 912 and the slices 918 of the picture 914 associated with the PH 912 without the need to have a picture header ID signaled in the PH 912 and referred to from the slice header 920. Consequently, it can be inferred that all VCL NAL units between two PHs 912 belong to the same picture 914 and that the picture 914 is associated with the first PH 912 between the two PHs 912. In an embodiment, the first VCL NAL unit that follows a PH 912 contains the first slice 918 of the picture 914 associated with the PH 912.

In an embodiment, the PH NAL unit follows picture level parameter sets (e.g., the PPS) or higher level parameter sets such as the DCI (a.k.a., the DPS), the VPS, the SPS, the PPS, etc. having both a temporal ID and a layer ID less than the temporal ID and layer ID of the PH NAL unit, respectively. Consequently, those parameter sets are not repeated within a picture or an access unit. Because of this ordering, the PH 912 can be resolved immediately. That is, parameter sets that contain parameters relevant to an entire picture are positioned in the bitstream before the PH NAL unit. Anything that contains parameters for part of a picture is positioned after the PH NAL unit.

In one alternative, the PH NAL unit follows picture level parameter sets and prefix supplemental enhancement information (SEI) messages, or higher level parameter sets such as the DCI (a.k.a., the DPS), the VPS, the SPS, the PPS, the APS, the SEI message, etc.

In an embodiment, the PH 912 may contain a syntax element (e.g., a flag, etc.) that specifies the picture type of the picture 914 associated with the PH 912. The picture type may include, but is not limited to, the following types: an instantaneous decoder refresh (IDR) picture, a clean random access (CRA) picture, a GDR picture, a non-IRAP picture that is a non-GDR picture and contains only intra predicted slices (I-slices), a non-IRAP picture that is a non-GDR picture and contains only uni-directional inter predicted slices (P-slices) and I-slices, and a non-IRAP picture that is a non-GDR picture and contains only bi-directional inter predicted slices (B-slices), P-slices, and I-slices. Thus, a single flag in a PH 912 is able to indicate whether all slices (e.g., slices 918) in a picture (e.g., picture 914) are, for example, slices of a GDR picture (e.g., GDR picture 702). This also supports signaling of the recovery point picture order count (POC) for the GDR picture once in the PH 912 instead of in every slice header (e.g., slice header 920).

In an embodiment, one or more syntax elements are signaled in the PH 912 instead of the slice headers 920 of the picture 914 associated with the PH 912. Those syntax elements are a PPS ID referred to by the picture 914, a flag specifying whether the picture 914 is a reference picture or not, a color plane of the picture 914, a POC least significant bit (LSB) of the picture 914, a recovery point POC if the picture 914 is a GDR picture (e.g., GDR picture 702), a flag specifying whether pictures prior to the picture 914 are output, and a flag specifying whether the picture 914 is an output picture or not. The PPS ID is an identifier that identifies a particular PPS for the picture 914. The color plane of the picture 914 comprises the luma and chroma components (e.g., Y, Cb, and Cr, etc.) for the picture 914. The POC LSB is the bit (or bits) that identify the POC. The POC is a variable that is associated with each picture (e.g., picture 914), uniquely identifies the associated picture among all pictures in the CLVS, and, when the associated picture is to be output from the DPB, indicates the position of the associated picture in output order relative to the output order positions of the other pictures in the same CLVS that are to be output from the DPB. The recovery point POC is a POC that identifies the recovery point and, consequently, the recovery point picture.

Moving these syntax elements from the slice headers 920 to the PH 912 allows the syntax elements to be signaled once for the entire picture 914 instead of repeating the syntax elements in each slice header 920. This reduces redundancy and increases coding efficiency.

The picture 914 is an array of luma samples in monochrome format or an array of luma samples and two corresponding arrays of chroma samples in 4:2:0, 4:2:2, and 4:4:4 colour format. In an embodiment, there is one and only one picture 914 included in each PU 901. As such, there is only one PH 912 and only one picture 914 corresponding to that PH 912 in each PU 901. That is, the PU 901 contains a single or lone picture 914.

The picture 914 may be either a frame or a field. However, in one CVS 916, either all pictures 914 are frames or all pictures 914 are fields. The CVS 916 is a coded video sequence for every coded layer video sequence (CLVS) in the video bitstream 900. Notably, the CVS 916 and the CLVS are the same when the video bitstream 900 includes a single layer. The CVS 916 and the CLVS are only different when the video bitstream 900 includes multiple layers (e.g., as shown in FIG. 5).

The PUs 901 may collectively comprise a CLVS. A CLVS is sequence of PUs 901 with the same value of nuh_layer_id that consists, in decoding order, of a coded layer video sequence start (CLVSS) PU, followed by zero or more PUs 901 that are not CLVSS PUs, including all subsequent PUs 901 up to but not including any subsequent PU 901 that is a CLVSS PU. A CLVSS PU is a PU 901 in which the coded picture (e.g., picture 914) is a CLVSS picture. A CLVSS picture is a coded picture that is IRAP picture with a NoOutputBeforeRecoveryFlag equal to 1 or a GDR picture (e.g., GDR picture 702) with NoOutputBeforeRecoveryFlag equal to 1. In an embodiment, the NoOutputBeforeRecoveryFlag for a picture is disposed in the PPS 908 or another portion of the PU 901.

Each picture 914 contains one or more slices 918. A slice 918 is an integer number of complete tiles or an integer number of consecutive complete CTU rows within a tile of a picture (e.g., picture 914). Each slice 918 is exclusively contained in a single NAL unit (e.g., a VCL NAL unit). A tile (not shown) is a rectangular region of CTUs within a particular tile column and a particular tile row in a picture (e.g., picture 914). A CTU (not shown) is a CTB of luma samples, two corresponding CTBs of chroma samples of a picture that has three sample arrays, or a CTB of samples of a monochrome picture or a picture that is coded using three separate color planes and syntax structures used to code the samples. A CTB (not shown) is an N×N block of samples for some value of N such that the division of a component into CTBs is a partitioning. A block (not shown) is an M×N (M-column by N-row) array of samples (e.g., pixels), or an M×N array of transform coefficients.

In an embodiment, each slice 918 contains a slice header 920. A slice header 920 is the part of the coded slice 918 containing the data elements pertaining to all tiles or CTU rows within a tile represented in the slice 918. That is, the slice header 920 contains information about the slice 918 such as, for example, the slice type, which of the reference pictures will be used, and so on.

The pictures 914 and their slices 918 comprise data associated with the images or video being encoded or decoded. Thus, the pictures 914 and their slices 918 may be simply referred to as the payload or data being carried in the bitstream 900.

In an embodiment, each picture 511, 513, 515-518 in FIG. 5 is part of, or contained in, a PU (e.g., PU 901) in the same or similar manner to the picture 914 as shown in FIG. 9. Therefore, each AU 506 in FIG. 5 contains a PU in each layer. However, for ease of illustration, the entire PU 901 of FIG. 9 is not depicted in FIG. 5. Rather, only the pictures (e.g., pictures 511, 513, 515-518) from those PUs are shown in FIG. 5.

In an embodiment, the first or initial AU 506 of the CLVS 540 in FIG. 5, which is designated as the CVSS AU, contains a PU (e.g., PU 901) for each layer (e.g., layer 531 and 532). Moreover, a coded picture (e.g., picture 511, 513) in each of those PUs in the CVSS AU is a CLVSS picture. As noted above, the CLVSS picture may be an IRAP picture, a GDR picture, or another random access point picture. In an embodiment, the CLVSS picture has a no output before recovery flag (a.k.a., NoOutputBeforeRecovery flag) set equal to one (1) to indicate that certain pictures (e.g., RASL pictures) are not output by the decoder because they may not be decodable. Indeed, such pictures may contain references to pictures that are not present in the bitstream.

In an embodiment, the number of layers in the CVSS AU and/or in the CLVS (e.g., CLVS 540) is specified by the VPS (e.g., 904).

Those skilled in the art will appreciate that the bitstream 900 may contain other parameters and information in practical applications.

Figure 10:
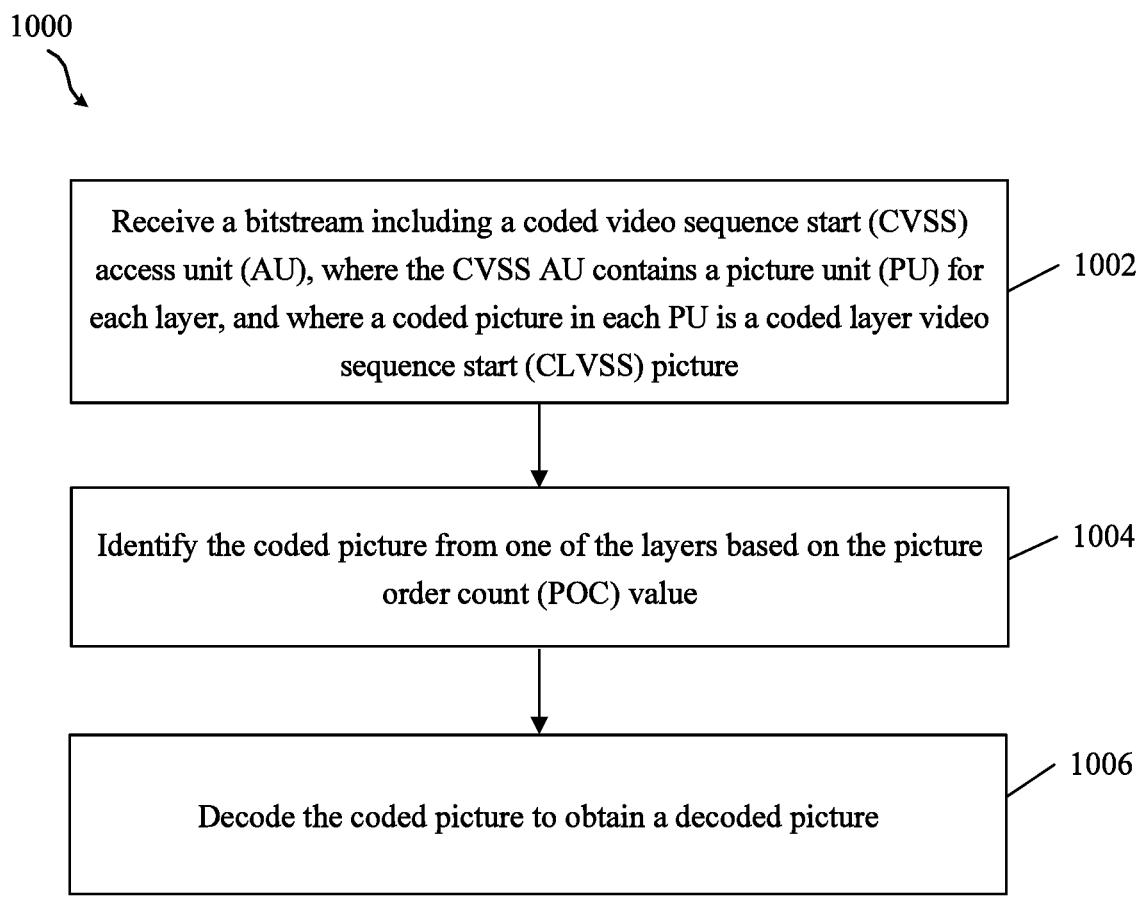
FIG. 10 is an embodiment of a method of decoding a coded video bitstream.

FIG. 10 is an embodiment of a method 1000 of decoding implemented by a video decoder (e.g., video decoder 400). The method 1000 may be performed after a bitstream has been directly or indirectly received from a video encoder (e.g., video encoder 300). The method 1000 improves the decoding process by utilizing a bitstream that is constrained so that each coded video sequence start (CVSS) access unit (AU) is a complete AU and each picture in the CVSS AU is a coded layer video sequence start (CLVSS) picture, which simplifies coding relative to current standards. This ensures that a random access point (RAP) is provided for each layer of the multi-layer bitstream at the start of every coded video sequence (CVS). Thus, the coder/decoder (a.k.a., "codec") in video coding is improved relative to current codecs. As a practical matter, the improved video coding process offers the user a better user experience when videos are sent, received, and/or viewed.

In block 1002, the video decoder receives a bitstream (e.g., bitstream 901) including a coded video sequence start (CVSS) access unit (AU) (e.g., the AU 506 designated as a CVSS AU). In an embodiment, the CVSS AU contains a picture unit (PU) (e.g., PU 901) for each layer (e.g., layer 531 and layer 532). In an embodiment, a coded picture (e.g., coded picture 511 and 515) in each PU is a coded layer video sequence start (CLVSS) picture.

In an embodiment, the video decoder expects a coded picture in each PU to be a CLVSS picture. If, however, the decoder determines that this condition is not true, the decoder may detect an error, signal an error, request that a revised bitstream (or a portion thereof) be resent, or take some other corrective measures to ensure that a conforming bitstream is received.

In an embodiment, the CLVSS picture is an intra random access point (TRAP) picture. In an embodiment, the CLVSS picture is gradual decoding refresh (GDR) picture. In an embodiment, the CLVSS picture has a no output before recovery flag equal to 1.

In an embodiment, each layer of the CVSS AU is specified by a video parameter set (VPS). That is, the VPS indicates how many layers are included in each AU of the CLVS. In an embodiment, the CVSS AU is an initial AU of a coded video sequence (CVS).

In an embodiment, the PU is referred to as a layer access unit. In an embodiment, the CVSS AU is referred to as a complete AU because each layer of the CVSS AU contains one of the PUs.

In block 1004, the video decoder identifies the coded picture (e.g., picture 914) from one of the layers based on a picture order count (POC) value. In block 1006, the video decoder decodes the coded picture to obtain a decoded picture. Once decoded, the decoded picture may be used to generate or produce an image or video sequence for display to a user on the display or screen of an electronic device (e.g., a smart phone, tablet, laptop, personal computer, etc.).

Figure 11:
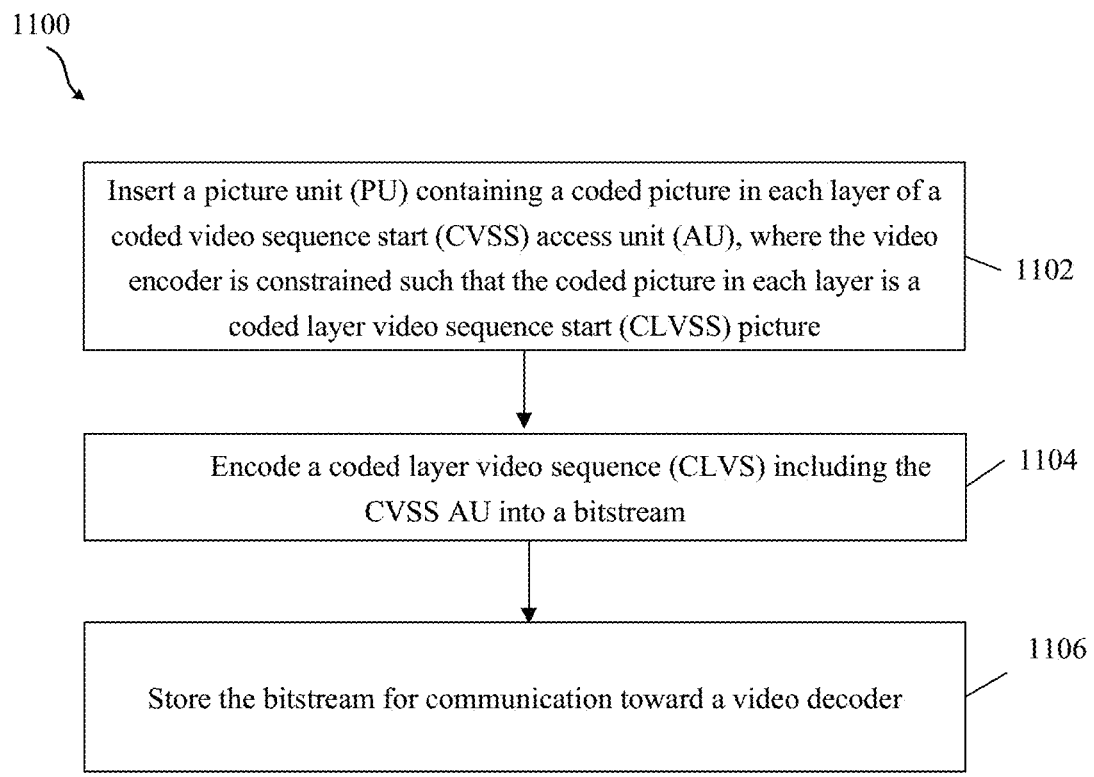
FIG. 11 is an embodiment of a method of encoding a coded video bitstream.

FIG. 11 is an embodiment of a method 1100 of encoding a video bitstream implemented by a video encoder (e.g., video encoder 300). The method 1100 may be performed when a picture (e.g., from a video) is to be encoded into a video bitstream and then transmitted toward a video decoder (e.g., video decoder 400). The method 1100 improves the encoding process by utilizing a bitstream that is constrained so that each coded video sequence start (CVSS) access unit (AU) is a complete AU and each picture in the CVSS AU is a coded layer video sequence start (CLVSS) picture, which simplifies coding relative to current standards. This ensures that a random access point (RAP) is provided for each layer of the multi-layer bitstream at the start of every coded video sequence (CVS). Thus, the coder/decoder (a.k.a., "codec") in video coding is improved relative to current codecs. As a practical matter, the improved video coding process offers the user a better user experience when videos are sent, received, and/or viewed.

In block 1102, the video encoder inserts a picture unit (PU) (e.g. PU 901) containing a coded picture (e.g., coded picture 511 and 515) in each layer (e.g., layer 531 and layer 532) of a coded video sequence start (CVSS) access unit (AU) (e.g., the AU 506 designated as a CVSS AU). In an embodiment, the coded picture is a coded layer video sequence start (CLVSS) picture. In an embodiment, the video encoder is constrained so that the coded picture is a coded layer video sequence start (CLVSS) picture. That is, the video encoder is required to have the coded picture be a coded layer video sequence start (CLVSS) picture. Such a constraint or requirement ensures that the bitstream conforms with, for example, VVC or some other standard, modified as indicated herein. However, the encoder may also be capable of operating in other modes where it is not so constrained, such as when operating under a different standard or a different version of the same standard.

In an embodiment, the CLVSS picture is an intra random access point (TRAP) picture. In an embodiment, the CLVSS picture is gradual decoding refresh (GDR) picture. In an embodiment, the CLVSS picture has a no output before recovery flag equal to 1.

In an embodiment, each layer of the CVSS AU is specified by a video parameter set (VPS). That is, the VPS indicates how many layers are included in each AU of the CLVS. In an embodiment, the CVSS AU is an initial AU of a coded video sequence (CVS).

In an embodiment, the PU is referred to as a layer access unit. In an embodiment, the CVSS AU is referred to as a complete AU because each layer of the CVSS AU contains one of the PUs.

In block 1104, the video encoder encodes a coded layer video sequence (CLVS) (e.g., CLVS 540) including the CVSS AU into a bitstream. In block 1106, the video encoder stores the bitstream for communication toward a video decoder. The video bitstream may be stored in memory until the video bitstream is transmitted toward the video decoder. Once received by the video decoder, the encoded video bitstream may be decoded (e.g., as described above) to generate or produce an image or video sequence for display to a user on the display or screen of an electronic device (e.g., a smart phone, tablet, laptop, personal computer, etc.).

Note that the solutions described herein still allow unsynchronized TRAP pictures across layers. However, for simplicity, the decoding process starting from an AU containing an TRAP picture in the lowest layer but a non-IRAP picture in other layers is not normatively specified. However, as long as the design allows unsynchronized TRAP pictures across layers, the technical benefits of such allowance can still be achieved in practice by implementations.

The following syntax and semantics may be employed to implement the embodiments disclosed herein. The following description is relative to the basis text, which is the latest VVC draft specification.

In an embodiment, an associated TRAP picture (of a particular picture with nuh_layer_id equal to a particular value layerId) is the previous IRAP picture in decoding order with nuh_layer_id equal to layerId (when present) between which there is no GDR picture with nuh_layer_id equal to layerId. nuh_layer_id specifies the identifier of the layer to which a VCL NAL unit belongs or the identifier of a layer to which a non-VCL NAL unit applies. The value of nuh_layer_id shall be in the range of 0 to 55, inclusive. Other values for nuh_layer_id are reserved for future use by ITU-T|ISO/FEC.

As used herein, a PU may also be referred to as a layer access unit. In an embodiment, a clean random access (CRA) layer access unit is a layer access unit in which the coded picture is a CRA picture. In an embodiment, a clean random access (CRA) picture is an TRAP picture for which each VCL NAL unit has nal_unit_type equal to CRA_NUT. In an embodiment, a CRA picture does not use inter prediction in its decoding process, and may be the first picture in the bitstream in decoding order, or may appear later in the bitstream. In an embodiment, a CRA picture may have associated RADL or RASL pictures. When a CRA picture has NoOutputBeforeRecoveryFlag equal to 1, the associated RASL pictures are not output by the decoder, because they may not be decodable, as they may contain references to pictures that are not present in the bitstream.

In an embodiment, a coded layer video sequence (CLVS) is a sequence of PUs with the same value of nuh_layer_id that consists, in decoding order, of a CLVSS PU, followed by zero or more PUs that are not CLVSS PUs, including all subsequent PUs up to but not including any subsequent PU that is a CLVSS PU. In an embodiment, a CLVSS PU may be an IDR PU, a CRA PU, or a GDR PU. The value of NoOutputBeforeRecoveryFlag is equal to 1 for each IDR PU, and each CRA PU that has HandleCraAsClvsStartFlag equal to 1, and each CRA or GDR PU that is the first PU in the layer of the bitstream in decoding order or the first PU in the layer of the bitstream that follows an EOS NAL unit in decoding order.

In an embodiment, a coded layer video sequence start (CLVSS) layer access unit is a layer access unit in which the coded picture is a CLVSS picture. A coded layer video sequence start (CLVSS) picture is a coded picture that is an TRAP picture with NoIncorrectPicOutputFlag equal to 1 or a GDR picture with NoIncorrectPicOutputFlag equal to 1.

In an embodiment, a coded video sequence (CVS): A sequence of access units that consists, in decoding order, of a CVSS access unit, followed by zero or more access units that are not CVSS access units, including all subsequent access units up to but not including any subsequent access unit that is a CVSS access unit.

In an embodiment, a coded video sequence start (CVSS) access unit: An access unit in which there is a layer access unit for each layer in the CVS and the coded picture in each layer access unit is a CLVSS picture. Note that this requires that each CVSS AU is a complete AU, and each picture in a CVSS AU is a CLVSS picture. In an embodiment, a gradual decoding refresh (GDR) access unit: An access unit in which the coded picture in each present layer access unit is a GDR picture. In an embodiment, a gradual decoding refresh (GDR) layer access unit: A layer access unit in which the coded picture is a GDR picture. In an embodiment, a gradual decoding refresh (GDR) picture: A picture for which each VCL NAL unit has nal_unit_type equal to GDR_NUT.

The SPS syntax is as follows.

|  | Descriptor |
|---|---|
| seq_parameter_set_rbsp( ) { | |
| ... | |
| log2_max_pic_order_cnt_lsb_minus4 | ue(v) |
| poc_msb_in_rap_pics_flag | u(1) |
| if( poc_msb_in_rap_pics_flag > 0 ) | |
| poc_msb_len_minus1 | ue(v) |
| ... | |
| } | |

In an embodiment, the above bolded syntax elements may be included in the VPS.

The slice header syntax is as follows.

|  | Descriptor |
|---|---|
| slice_header( ) { | |
| slice_pic_parameter_set_id | ue(v) |
| if( rect_slice_flag | | NumBricksInPic > 1 ) | |
| slice_address | u(v) |
| if( !rect_slice_flag && !single_brick_per_slice_flag ) | |
| num_bricks_in_slice_minus1 | ue(v) |
| non_reference_picture_flag | u(1) |
| slice_type | ue(v) |
| if( separate_colour_plane_flag = = 1) | |
| colour_plane_id | u(2) |
| slice_pic_order_cnt_lsb | u(v) |
| if( poc_msb_in_rap_pics_flag && | |
| nal_unit_type >= IDR_W_RADL && nal_unit_type <= GDR_NUT ) | |
| poc_msb_val | u(v) |
| if( nal_unit_type = = GDR_NUT ) | |
| recovery_poc_cnt | ue(v) |
| ... | |
| } | |

In an embodiment, the syntax condition part "&& nal_unit_type>=IDR_W_RADL && nal_unit_type<=GDR_NUT" may be removed. That is, signal poc_msb_val for slices with any value of nal_unit_type when poc_msb_in_rap_pics_flag is equal to 1.

In an embodiment, add one picture-level flag to condition the presence of the syntax element poc_msb_val. That is, allow encoders to decide either to signal or not signal poc_msb_val individually for each slice of an IRAP or GDR picture when poc_msb_in_rap_pics_flag is equal to 1.

In an embodiment, apply both alternatives above. In an embodiment, signal poc_msb_val using se(v) or ue(v), and remove the poc_msb_len_minus1 syntax element from the SPS syntax.

The NAL unit header semantics are provided.

nuh_layer_id specifies the identifier of the layer to which a VCL NAL unit belongs or the identifier of a layer to which a non-VCL NAL unit applies.

The value of nuh_layer_id shall be the same for all VCL NAL units of a coded picture. The value of nuh_layer_id of a coded picture or a layer access unit is the value of the nuh_layer_id of the VCL NAL units of the coded picture or the layer access unit.

nal_unit_type specifies the NAL unit type, i.e., the type of RBSP data structure contained in the NAL unit.

The value of nal_unit_type shall be the same for all coded slice NAL units of a picture. A picture or a layer access unit is referred to as having the same NAL unit type as the coded slice NAL units of the picture or layer access unit. Note that the above two paragraphs allow VCL NAL units within an AU to have different NAL unit types, which allows mixed RAP and non-RAP pictures within an AU. A RAP picture is an IDR, CAR, or GDR picture.

The value of nal_unit_type shall be the same for pictures of a CVSS access unit.

The order of access units and association to CVSs is provided.

A bitstream conforming to the standard includes one or more CVSs. A CVS consists of one or more access units. The first access unit of a CVS is a CVSS access unit, wherein each present layer access unit is a CLVSS layer access unit, which is either an TRAP layer access unit with NoIncorrectPicOutputFlag equal to 1 or a GDR layer access unit with NoIncorrectPicOutputFlag equal to 1. Each CVSS access unit shall have a picture in each of the layers present in the CVS. It is a requirement of bitstream conformance that, when present, each layer access unit in the next access unit after an access unit that contains an end of sequence NAL unit or an end of bitstream NAL unit shall be an IRAP layer access unit, which may be an IDR layer access unit or a CRA layer access unit, or a GDR layer access unit.

The SPS semantics are provided.

log 2max_pic_order_cnt_lsb_minus4 specifies the value of the variable MaxPicOrderCntLsb that is used in the decoding process for picture order count as follows:

MaxPicOrderCntLsb=2(log 2_max_pic_order_cnt_lsb_minus4+4)

The value of log 2_max_pic_order_cnt_lsb_minus4 shall be in the range of 0 to 12, inclusive.

poc_msb_in_rap_pics_flag equal to 1 specifies that the poc_msb_val syntax element is signaled for pictures referring to the SPS and for which the VCL NAL units have nal_unit_type in the range of IDR_W_RADL to GDR_NUT, inclusive. poc_msb_in_rap_pics_flag equal to 0 specifies that the poc_msb_val syntax element is not signaled for pictures referring to the SPS.

poc_msb_len_minus1 plus 1 specifies the length, in bits, of the poc_msb_val syntax elements, when present. The value of poc_msb_len_minus1 shall be in the range of 0 to 32—log 2_max_pic_order_cnt_lsb_minus4-5, inclusive.

Slice header semantics are provided.

slice_pic_order_cnt_lsb specifies the picture order count modulo MaxPicOrderCntLsb for the current picture. The length of the slice_pic_order_cnt_lsb syntax element is log

---

```
if( ( slice_pic_order_cnt_lsb < prevPicOrderCntLsb ) &&
    ( ( prevPicOrderCntLsb - slice_pic_order_cnt_lsb ) >= ( MaxPicOrderCntLsb / 2 )
) )
    PicOrderCntMsb = prevPicOrderCntMsb + MaxPicOrderCntLsb    (8-1)
else if( (slice_pic_order_cnt_lsb > prevPicOrderCntLsb ) &&
    ( ( slice_pic_order_cnt_lsb - prevPicOrderCntLsb ) > ( MaxPicOrderCntLsb / 2 ) )
)
    PicOrderCntMsb = prevPicOrderCntMsb - MaxPicOrderCntLsb
else
    PicOrderCntMsb = prevPicOrderCntMsb
```

---

2_max_pic_order_cnt_lsb_minus4+4 bits. The value of the slice_pic_order_cnt_lsb shall be in the range of 0 to MaxPicOrderCntLsb−1, inclusive.

poc_msb_val specifies the POC MSB value of the current picture. The length of the syntax element poc_msb_val is poc_msb_len_minus1+1 bits.

A decoding process for a coded picture is provided.

PictureOutputFlag is set as follows:

If one of the following conditions is true, PictureOutputFlag is set equal to 0.

the current picture is a RASL picture and NoIncorrectPicOutputFlag of the associated IRAP picture is equal to 1.

gdr_enabled_flag is equal to 1 and the current picture is a GDR picture with NoIncorrectPicOutputFlag equal to 1.

gdr_enabled_flag is equal to 1, the current picture is associated with a GDR picture with NoIncorrectPicOutputFlag equal to 1, and PicOrderCntVal of the current picture is less than RpPicOrderCntVal of the associated GDR picture.

The current picture does not belong to an output layer.

Otherwise, PictureOutputFlag is set equal to pic output flag.

A decoding process for picture order count is provided.

Output of this process is PicOrderCntVal, the picture order count of the current picture.

Each coded picture is associated with a picture order count variable, denoted as PicOrderCntVal.

When poc_msb_val is not present for the picture and the current picture is not a CLVSS picture, the variables prevPicOrderCntLsb and prevPicOrderCntMsb are derived as follows:

Let prevTid0Pic be the previous picture in decoding order that has nuh_layer_id equal to the nuh_layer_id of the current picture and TemporalId equal to 0 and that is not a RASL or RADL picture.

The variable prevPicOrderCntLsb is set equal to slice_pic_order_cnt_lsb of prevTid0Pic.

The variable prevPicOrderCntMsb is set equal to PicOrderCntMsb of prevTid0Pic.

The variable PicOrderCntMsb of the current picture is derived as follows.

If poc_msb_val is present for the picture, PicOrderCntMsb is set equal to poc_msb_val*MaxPicOrderCntLsb.

Otherwise (poc_msb_val is not present for the picture), if the current picture is a CLVSS picture, PicOrderCntMsb is set equal to 0.

Otherwise, PicOrderCntMsb is derived as follows.

PicOrderCntVal is derived as follows.

PicOrderCntVal=PicOrderCntMsb+slice_pic_order_cnt_lsb (8-2)

NOTE—All CLVSS pictures for which poc_msb_val is not present will have PicOrderCntVal equal to slice_pic_order_cnt_lsb since for those pictures PicOrderCntMsb is set equal to 0.

The value of PicOrderCntVal shall be in the range of −231 to 231−1, inclusive.

In one CVS, the PicOrderCntVal values for any two coded pictures with the same value of nuh_layer_id shall not be the same.

All pictures in any particular access unit shall have the same value of PicOrderCntVal.

The function PicOrderCnt(picX) is specified as follows:

$$\text{PicOrderCnt}(picX)=\text{PicOrderCntVal of the picture } picX \tag{8-3}$$

The function DiffPicOrderCnt(picA, picB) is specified as follows:

$$\text{DiffPicOrderCnt}(picA,picB)=\text{PicOrderCnt}(picA)-\text{PicOrderCnt}(picB) \tag{8-4}$$

The bitstream shall not contain data that result in values of DiffPicOrderCnt(picA, picB) used in the decoding process that are not in the range of −215 to 215−1, inclusive.

NOTE—Let X be the current picture and Y and Z be two other pictures in the same CVS, Y and Z are considered to be in the same output order direction from X when both DiffPicOrderCnt(X, Y) and DiffPicOrderCnt(X, Z) are positive or both are negative.

Figure 12:
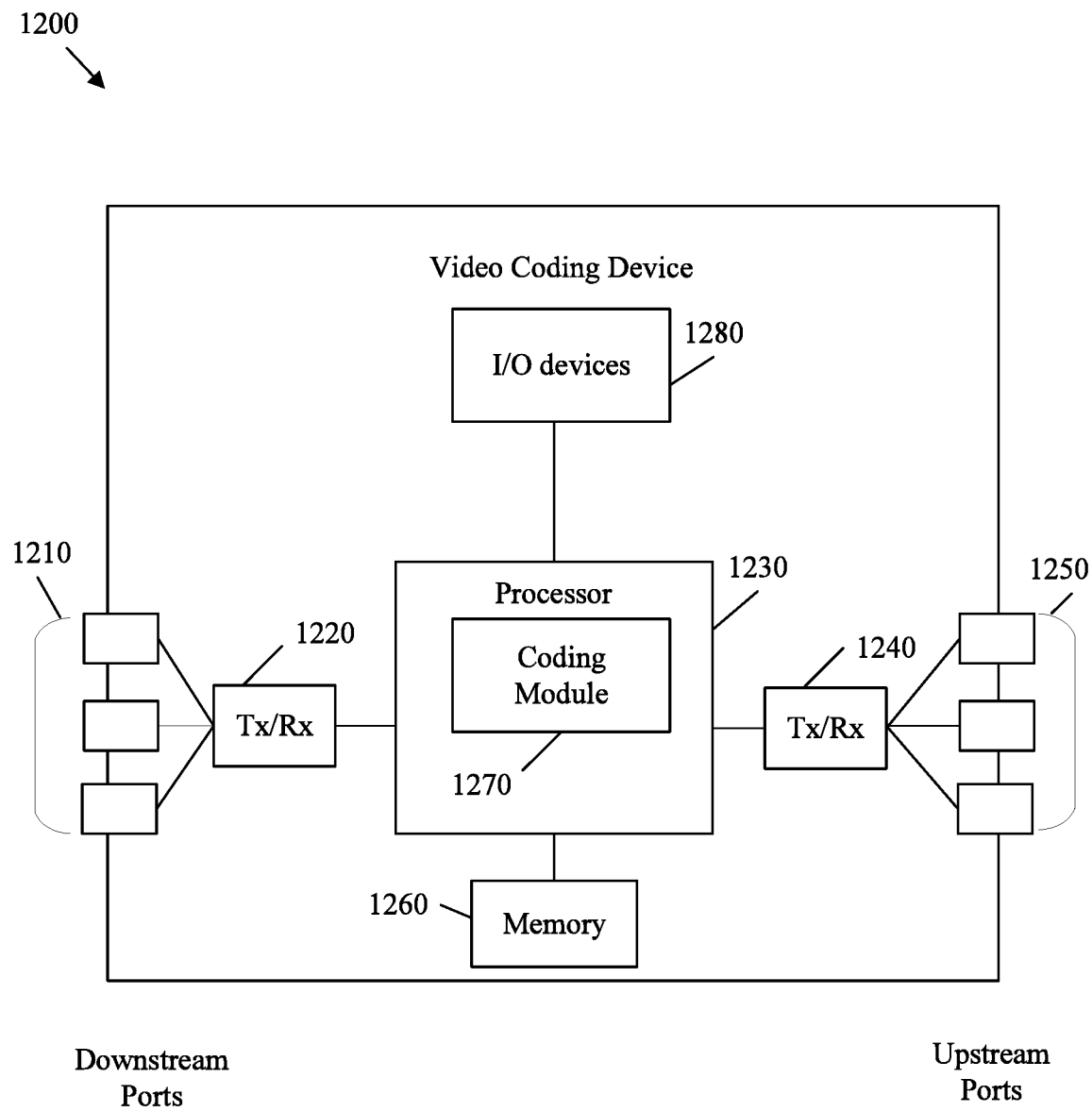
FIG. 12 is a schematic diagram of a video coding device.

FIG. 12 is a schematic diagram of a video coding device 1200 (e.g., a video encoder 300 or a video decoder 400) according to an embodiment of the disclosure. The video coding device 1200 is suitable for implementing the disclosed embodiments as described herein. The video coding device 1200 comprises ingress ports 1210 and receiver units (Rx) 1220 for receiving data; a processor, logic unit, or central processing unit (CPU) 1230 to process the data; transmitter units (Tx) 1240 and egress ports 1250 for transmitting the data; and a memory 1260 for storing the data. The video coding device 1200 may also comprise optical-to-electrical (OE) components and electrical-to-optical (EO) components coupled to the ingress ports 1210, the receiver units 1220, the transmitter units 1240, and the egress ports 1250 for egress or ingress of optical or electrical signals.

The processor 1230 is implemented by hardware and software. The processor 1230 may be implemented as one or more CPU chips, cores (e.g., as a multi-core processor), field-programmable gate arrays (FPGAs), application specific integrated circuits (ASICs), and digital signal processors (DSPs). The processor 1230 is in communication with the ingress ports 1210, receiver units 1220, transmitter units 1240, egress ports 1250, and memory 1260. The processor 1230 comprises a coding module 1270. The coding module 1270 implements the disclosed embodiments described above. For instance, the coding module 1270 implements, processes, prepares, or provides the various codec functions. The inclusion of the coding module 1270 therefore provides a substantial improvement to the functionality of the video coding device 1200 and effects a transformation of the video coding device 1200 to a different state. Alternatively, the coding module 1270 is implemented as instructions stored in the memory 1260 and executed by the processor 1230.

The video coding device 1200 may also include input and/or output (I/O) devices 1280 for communicating data to and from a user. The I/O devices 1280 may include output devices such as a display for displaying video data, speakers for outputting audio data, etc. The I/O devices 1280 may also include input devices, such as a keyboard, mouse, trackball, etc., and/or corresponding interfaces for interacting with such output devices.

The memory 1260 comprises one or more disks, tape drives, and solid-state drives and may be used as an over-flow data storage device, to store programs when such programs are selected for execution, and to store instructions and data that are read during program execution. The memory 1260 may be volatile and/or non-volatile and may be read-only memory (ROM), random access memory (RAM), ternary content-addressable memory (TCAM), and/or static random-access memory (SRAM).

Figure 13:
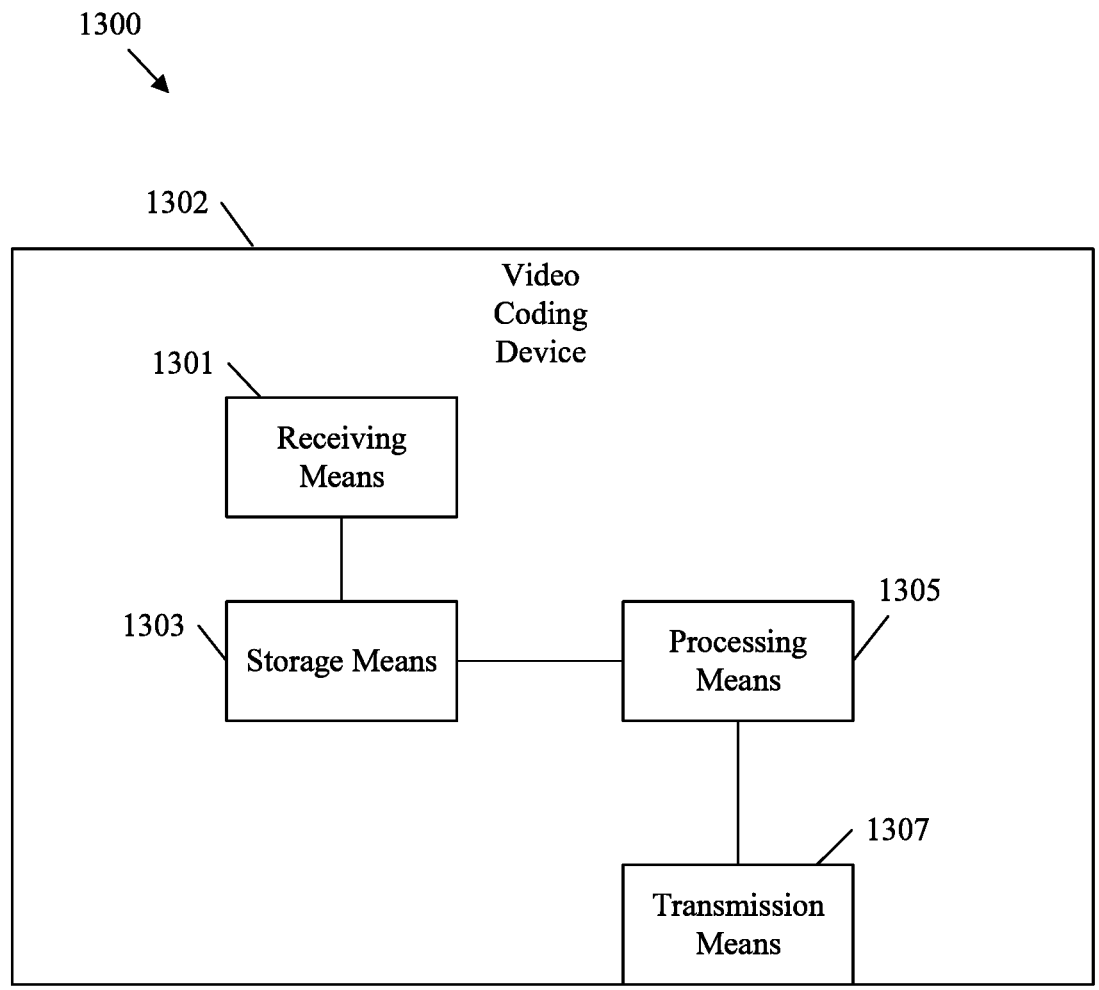
FIG. 13 is a schematic diagram of an embodiment of a means for coding.

FIG. 13 is a schematic diagram of an embodiment of a means for coding 1300. In an embodiment, the means for coding 1300 is implemented in a video coding device 1302 (e.g., a video encoder 300 or a video decoder 400). The video coding device 1302 includes receiving means 1301. The receiving means 1301 is configured to receive a picture to encode or to receive a bitstream to decode. The video coding device 1302 includes transmission means 1307 coupled to the receiving means 1301. The transmission means 1307 is configured to transmit the bitstream to a decoder or to transmit a decoded image to a display means (e.g., one of the I/O devices 1280).

The video coding device 1302 includes a storage means 1303. The storage means 1303 is coupled to at least one of the receiving means 1301 or the transmission means 1307. The storage means 1303 is configured to store instructions. The video coding device 1302 also includes processing means 1305. The processing means 1305 is coupled to the storage means 1303. The processing means 1305 is configured to execute the instructions stored in the storage means 1303 to perform the methods disclosed herein.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of decoding implemented by a video decoder, comprising:
   receiving a bitstream including a coded video sequence start (CVSS) access unit (AU), wherein the CVSS AU contains a picture unit (PU) for each layer, and wherein a coded picture in each PU is a coded layer video sequence start (CLVSS) picture;
   identifying the coded picture from one of the layers based on a picture order count (POC) value; and
   decoding the coded picture to obtain a decoded picture.

2. The method of claim 1, wherein the CLVSS picture is an intra random access point (IRAP) picture.

3. The method of claim 1, wherein the CLVSS picture is a gradual decoding refresh (GDR) picture.

4. The method of claim 1, wherein the CLVSS picture is associated with a no output before recovery flag, and wherein the no output before recovery flag is equal to 1.

5. The method of claim 1, wherein each layer of the CVSS AU is specified by a video parameter set (VPS).

6. The method of claim 1, wherein the CVSS AU is an initial AU of a coded video sequence (CVS).

7. The method of claim 1, further comprising displaying the coded picture as decoded on a display of an electronic device.

8. The method of claim 1, further comprising:
   receiving a second video bitstream including a second CVSS AU, wherein the second CVSS AU contains a picture unit (PU) for each layer, and wherein a coded picture in each PU is not a CLVSS picture; and
   in response to the receiving, taking some other corrective measures to ensure that a conforming bitstream corresponding to the second video bitstream is received prior to decoding the coded picture.

9. A method of encoding implemented by a video encoder, the method comprising:
   inserting a picture unit (PU) containing a coded picture in each layer of a coded video sequence start (CVSS) access unit (AU), wherein the video encoder is constrained such that the coded picture in each layer is a coded layer video sequence start (CLVSS) picture;
   encoding a coded layer video sequence (CLVS) including the CVSS AU into a bitstream; and
   storing the bitstream for communication toward a video decoder.

10. The method of claim 9, wherein the CLVSS picture is an intra random access point (IRAP) picture.

11. The method of claim 9, wherein the CLVSS picture is a gradual decoding refresh (GDR) picture.

12. The method of claim 9, wherein each layer of the CVSS AU is specified by a video parameter set (VPS).

13. A decoding device, comprising:
- a receiver configured to receive a bitstream including a coded video sequence start (CVSS) access unit (AU), wherein the CVSS AU contains a picture unit (PU) for each layer, and wherein a coded picture in each PU is a coded layer video sequence start (CLVSS) picture;
- a memory coupled to the receiver, the memory storing instructions; and
- one or more processors coupled to the memory, the one or more processors configured to execute the instructions to cause the decoding device to:
- identify the coded picture from one of the layers based on a picture order count (POC) value; and
- decode the coded picture to obtain a decoded picture.

14. The decoding device of claim 13, wherein the CLVSS picture is an intra random access point (IRAP) picture.

15. The decoding device of claim 13, wherein the CLVSS picture is a gradual decoding refresh (GDR) picture.

16. The decoding device of claim 13, wherein each layer of the CVSS AU is specified by a video parameter set (VPS).

* * * * *